(12) United States Patent
Schwendimann et al.

(10) Patent No.: US 8,662,893 B2
(45) Date of Patent: Mar. 4, 2014

(54) THERMOCHROMATIC INKS, PRINTING METHODS AND KITS

(75) Inventors: Jodi A. Schwendimann, Minnetonka Beach, MN (US); Jahn Stopperan, Lakeville, MN (US); Terry C. Schultz, New Hope, MN (US)

(73) Assignee: NuCoat, Inc., Plymouth, MN (US)

( * ) Notice: Subject to any disclaimer, the term of this patent is extended or adjusted under 35 U.S.C. 154(b) by 279 days.

(21) Appl. No.: 13/031,651

(22) Filed: Feb. 22, 2011

(65) Prior Publication Data

US 2011/0212421 A1    Sep. 1, 2011

Related U.S. Application Data

(60) Provisional application No. 61/306,076, filed on Feb. 19, 2010, provisional application No. 61/330,133, filed on Apr. 30, 2010.

(51) Int. Cl.
*G09B 11/00* (2006.01)

(52) U.S. Cl.
USPC .......................................................... 434/85

(58) Field of Classification Search
USPC ............ 434/81, 84, 85, 98, 428, 430; 446/14; 106/31.16; 283/72, 84; 428/913
See application file for complete search history.

(56) References Cited

U.S. PATENT DOCUMENTS

| | | | | |
|---|---|---|---|---|
| 5,011,445 A * | 4/1991 | Nakasuji et al. | ........... | 446/14 |
| 5,441,418 A * | 8/1995 | Brown et al. | ........... | 434/85 |
| 5,502,967 A * | 4/1996 | Nakagawa et al. | ........... | 62/3.3 |
| 5,514,635 A * | 5/1996 | Filo | ........... | 503/200 |
| 5,786,838 A * | 7/1998 | Steinhauser et al. | ........... | 347/179 |
| 6,281,165 B1 * | 8/2001 | Cranford | ........... | 503/226 |
| 6,346,024 B1 * | 2/2002 | Engel | ........... | 446/14 |
| 6,481,753 B2 * | 11/2002 | Van Boom et al. | ........... | 283/72 |
| 6,594,927 B2 * | 7/2003 | Witkowski | ........... | 40/310 |
| 7,144,289 B2 * | 12/2006 | Murasko et al. | ........... | 445/25 |
| 7,494,537 B2 * | 2/2009 | Ono et al. | ........... | 106/31.16 |
| 7,691,458 B2 * | 4/2010 | Brist et al. | ........... | 428/1.3 |
| 8,033,705 B2 * | 10/2011 | Forrester et al. | ........... | 362/558 |
| 8,325,416 B2 * | 12/2012 | Lesage et al. | ........... | 359/462 |
| 2005/0165131 A1 * | 7/2005 | Stovold | ........... | 523/160 |
| 2008/0050540 A1 * | 2/2008 | Christofer et al. | ........... | 428/13 |
| 2010/0264640 A1 * | 10/2010 | Lane et al. | ........... | 283/67 |

* cited by examiner

*Primary Examiner* — Kurt Fernstrom
(74) *Attorney, Agent, or Firm* — Schwegman, Lundberg & Woessner, P.A.

(57) ABSTRACT

The present invention relates to thermochromatic inks. The present invention provides a toy, wherein the toy includes at least one thermochromatic ink. The present invention provides a pre-printed item, wherein when the temperature of the pre-printed item is changed to particular temperatures, the color of a marking, the color of a drawing, or both, change. The present invention provides an interactive item, wherein the visual appearance of the item is changed by changing the color of at least one of a first or second inks. The present invention provides a drawing device, wherein the position of a substrate and a temperature element are such that a thermochromatic ink does not change color unless sufficient pressure is applied to the substrate effective to deflect the surface of the substrate and bring it temporarily sufficiently more proximate to the temperature element. The present invention provides a smart wand for drawing on a substrate that includes thermochromatic ink. The present invention provides a backlight system. The present invention provides a light box.

23 Claims, 18 Drawing Sheets

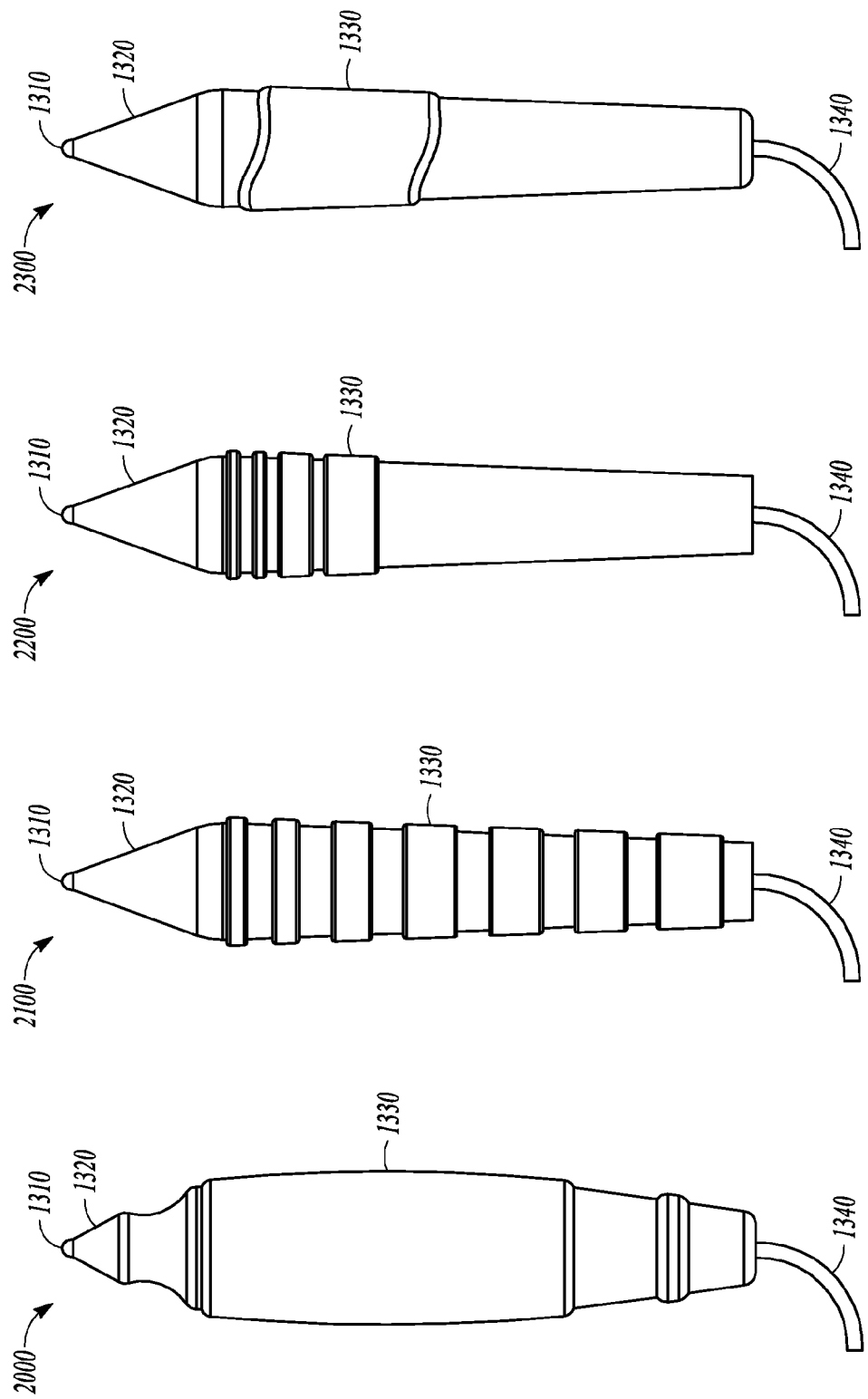

THERMOCHROMATIC INKS, PRINTING METHODS AND KITS

RELATED APPLICATIONS

This application claims priority under 35 U.S.C. §119(e) to U.S. Provisional Patent Application No. 61/306,076, filed Feb. 19, 2010, which application is incorporated herein by reference in its entirety. This application also claims priority under 35 U.S.C. §119(e) to U.S. Provisional Patent Application No. 61/330,133, filed Apr. 30, 2010, which application is incorporated herein by reference in its entirety.

BACKGROUND

Thermochromatic inks are inks that change color in reaction to temperatures. They can be formulated such that they change from any color to any color, including turning from opaque or translucent colors, or turning to opaque or translucent colors, in reaction to a wide variety of temperatures. They can be formulated such that they change colors at a variety of temperatures, such that a particular formulation can have several different temperature transition points, each with a particular color change from one particular color to another. They can be mixed with non-thermochromatic inks, such that blending of the constant color of the non-thermochromatic ink with the temperature-dependent color of the thermochromatic ink occurs.

Thermochromatic inks are formulated using chemical compounds that have thermochromatic properties. These thermochromatic compounds generally come in two forms. The first common form is thermochromatic liquid crystals. The color change of these substances is dependent on selective reflection of certain wavelengths by the crystal structure of the material. As the temperature changes, the crystal structure can change between a low-temperature crystal structure, an anisotropic chiral or twisted nematic crystal structure, and a high-temperature isotropic liquid phase. These compounds find application in thermochromatic inks in which color change occurs at a specific temperature, and can sometimes be found in, for example, thermometers for room, refrigerator, aquarium, and medical use, and also in indicators that show the level of propane in pressurized tanks.

The second common form of thermochromatic compounds are leuco dyes. These substances work by having more than one molecular form, which can change via protonation. The different forms have different pi-bond chromophores, thus they exhibit different colors. By making the protonation of the substance dependent on a desired temperature, for example by placing the substance with a weak acid in a solvent that melts at that desired temperature, the color of the substance can be dependent on temperature as well. Leuco dyes change color at a less narrow and less predictable temperature than liquid crystals. Leuco dues have found application in clothing that changes color depending on the heat of the wearer. Both liquid crystals and leuco dyes are usually found in the form of microcapsules both in inks and in other applications.

Some thermochromatic compounds are formulated such that they can reversibly change color, such that they change to a particular color after crossing a particular temperature, and then can change back to the original color when crossing back over that particular temperature. Other thermochromatic compounds are formulated such that they retain a coloration change once the coloration change has occurred.

Some of the applications for thermochromatic compounds include mood rings, measuring the temperature of a liquid in a coffee cup, and indicating when to take a bottle of syrup out of the microwave by the color of a temperature-sensitive label. Other uses include taking someone's temperature with a piece of paper on the forehead, labels for boxes of perishable foods, and battery level monitors.

Toys benefit people in both the educational process and in providing amusement. This is particularly so in the case of children, because they need stimulation to develop their minds and to expend their energy. Toys that have interesting colors or other properties can be fun or educational. For example, devices that allow one to make and show drawn images are useful as toys, as drawing tools for people of any age, and for commercial applications such as showing the day's menu in a restaurant setting. Having such a device that is backlit can enhance the visual appeal of the drawing.

Backlit image display devices are valuable means of displaying images. Such devices can enhance the visual appearance of an image, an effect that can be even more pronounced in dimly lit settings. When shown by such a device, an image with colored or translucent or clear markings or background can be enhanced such that the backlight shows at least partially through and illuminates the markings or background. Simply placing incandescent or florescent light bulbs behind an image is one way to accomplish this effect. Energy- and space-efficient means of illuminating an image from the back are needed.

Coloring and drawing is a creative and satisfying activity for both adults and children. Items for coloring and drawing with pre-printed markings such as coloring books or dot-to-dots are interesting and satisfying ways for people to experience coloring and drawing. After these items are used, they cannot generally be used again. Also, the pre-printed markings in these items that help guide the user can remain visible after the user is finished, which can detract from the visual aesthetics of the resulting colored or drawn design.

SUMMARY

The present invention relates to thermochromatic inks. The invention provides a toy. Also, the toy includes at least one thermochromatic ink. Additionally, the thermochromatic ink can change from a first color to a second color when the temperature of the ink reaches a first temperature. Also, the thermochromatic ink can reversibly change color. Also, the thermochromatic ink can return to the first color when cooled below a second temperature.

The present invention provides a pre-printed item. The pre-printed item includes a substrate. The substrate includes a pre-made marking. The substrate is configured such that a drawing can be made on the substrate by a user. Additionally, when the temperature of the pre-printed item is changed to particular temperatures, the color of the marking, the color of the drawing, or both, change. At least one of the marking or the drawing includes a thermochromatic ink.

The present invention provides an interactive item. The interactive item includes a first marking that includes a first ink. Also, the interactive item includes a second marking that includes a second ink. Also, the second marking at least partially covers the second marking. Also, at least one of the first or second ink includes a thermochromatic ink. Additionally, changing the temperature of at least part of the interactive item alters the visual appearance of the item. The visual appearance of the item is changed by changing the color of at least one of the first or second inks.

The present invention provides a drawing device. The drawing device includes a heating element. Additionally, the drawing device includes a source of illumination. Also, the drawing device includes a sheet of substrate that includes at least one thermochromatic ink. The position of the substrate and the heating element is such that the thermochromatic ink does not change color unless sufficient pressure is applied to the substrate effective to deflect at least part of the surface of the substrate and bring it temporarily sufficiently more proximate to the heating element.

The present invention provides a backlight system. The backlight system includes a plastic sheet. The backlight system also includes a source of light. The plastic sheet includes at least two major faces. The two major faces are disposed opposite to one another. The plastic sheet also includes at least one edge. The source of light is alight with at least one edge of the sheet. The plastic sheet acts as a light pipe, such that at least one major face of the backlight system is illuminated.

The present invention provides a smart wand. The smart wand includes a wand. The wand is includes a length for grasping by a user. The wand also includes a tip for drawing on a substrate. The substrate includes at least one thermochromatic ink. Drawing on the substrate includes changing the temperature of at least one thermochromatic ink. The temperature change of the at least one thermochromatic ink is sufficient to elicit a color change of the at least one thermochromatic ink. The tip of the wand includes either a removable tip, or a nonremovable permanent tip.

The present invention provides a light box. The light box includes a flat work surface. The flat work surface is configured to hold a substrate. The substrate includes markings that include thermochromatic ink. The light box also includes a lighting system. The lighting system provides light to the work surface.

The present invention provides certain advantages over other known applications and compositions of thermochromatic inks. The present invention provides compositions, toys, items, and devices that include or manipulate thermochromatic inks that are fun or educational for children or adults to use. Embodiments of the present invention can exhibit unmasking or combinations of colors at various temperatures, enabling an artistic or educational experience for the user. Some embodiments of the present invention can be reset and reused, providing multiple educational or artistic experiences for the user, and saving the user the costs of constantly replacing materials. Some embodiments can provide a different artistic or educational experience each time for the user. In some embodiments, multiple colors are made available to the user depending on the temperature change induced, providing an artistically more varied and richer experience to the user. Some embodiments of the present invention can provide an illuminated artistic or educational experience with temperature-induced color change. Embodiments of the present invention can allow for creative play by a child with reduced risk of mess or of permanent coloring marks on furniture, walls, or other consequences of using standard coloring inks or paints to have an artistic experience. In some embodiments, a smart wand or pen with heated or cooled tips can induce simple or complex color changes and pattern formation with one or more thermochromatic inks. In some embodiments, a smart wand or pen with heated or cooled tips can return to a safe temperature sufficiently quickly to be safe to be used by children.

BRIEF DESCRIPTION OF THE DRAWINGS

The drawings illustrate generally, by way of example, but not by way of limitation, various embodiments discussed in the present document.

FIG. 23 illustrates a wand, in accordance with at least one embodiment of the present invention.

FIG. 24 illustrates a wand, in accordance with at least one embodiment of the present invention.

FIG. 25 illustrates a wand, in accordance with at least one embodiment of the present invention.

FIG. 26 illustrates a wand, in accordance with at least one embodiment of the present invention.

DETAILED DESCRIPTION

Figure 1:
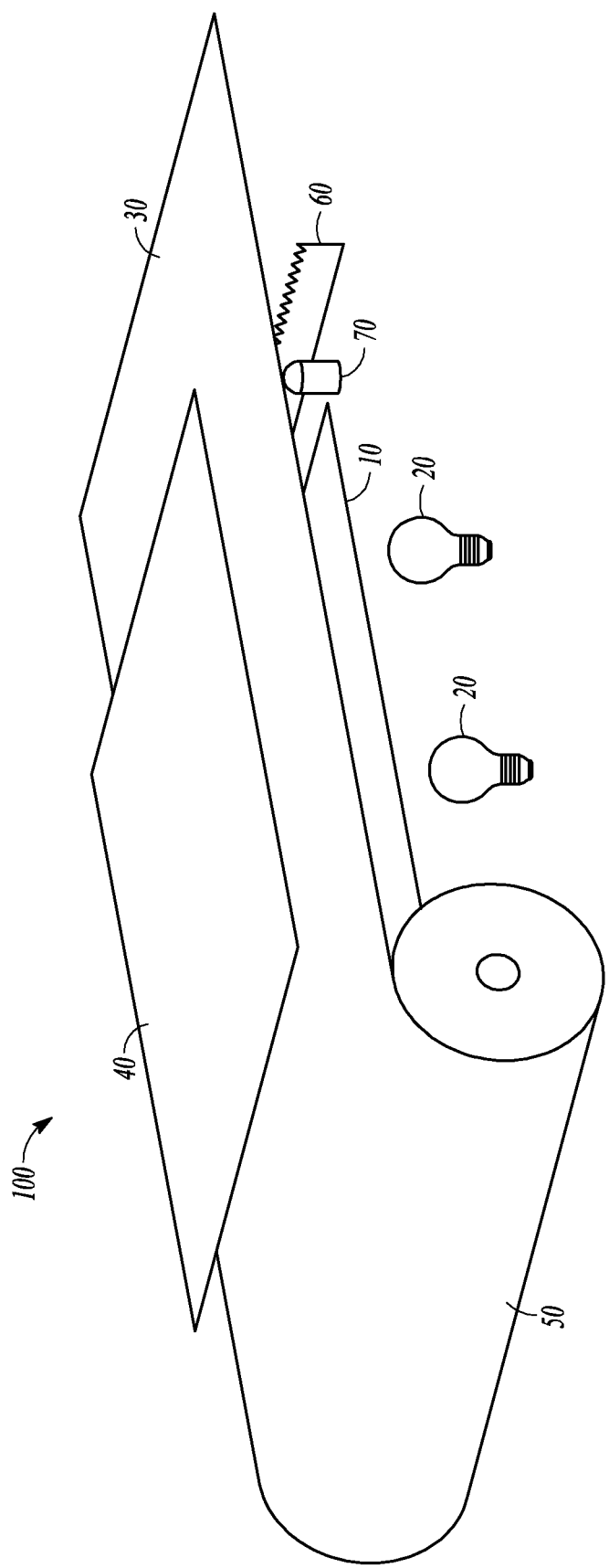
FIG. 1 illustrates a drawing device, in accordance with at least one embodiment of the present invention.

Reference will now be made in detail to certain claims of the disclosed subject matter, examples of which are illustrated in the accompanying drawings. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which can be included within the scope of the presently disclosed subject matter as defined by the claims.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated, or carried out simultaneously with other steps.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DEFINITIONS

As used herein, "change color" refers to changing from one color to another, where the first or second color can be white, colored, transparent, translucent, opaque, or any combination thereof.

As used herein, "draw" or "drawing" refers to making marks on paper or some other suitable surface using any suitable marking device including pencils, paints, pens, and fingers. The marks made can connect dots, form any type of image, including by filling shapes with colors.

As used herein, "freezer" refers to a device that brings an object's temperature to below approximately 4.4 degrees C.

As used herein, "marking" or "mark" refers to any image, design, line, dot, picture, or combination thereof.

As used herein, "substrate" refers to any material on which markings or drawing can be made, including but not limited to paper, plastic, films, canvas, cloth, and other suitable materials.

As used herein, "toy" refers to an item designed to be played with, including for fun or as an educational device.

To better illustrate the present thermochromatic inks, printing methods and kits, a non-limiting list of examples is provided here:

In Example 1, one or more thermochromatic inks are used in a coloring set.

In Example 2, the coloring set of Example 1 is a dot-to-dot.

In Example 3, the one or more thermochromatic inks of Example 1 are printed on a substrate.

In Example 4, the one or more thermochromatic inks of Example 1 are optionally configured such that they form an image.

In Example 5, the substrate of Example 3 is a piece of paper, and is configured to be highly porous.

In Example 5a, the substrate of Example 3 is a piece of polymer-based film.

In Example 6, the one or more thermochromatic inks of Example 1 form an image that can disappear on a piece of paper, when heated.

In Example 7, the one or more thermochromatic inks of Example 6 are configured to reappear through a cooling process.

In Example 8, a process of coating one or more thermochromatic inks onto a piece of paper is performed.

In Example 9, one or more thermochromatic inks are used to form a mess-free scratch off product.

In Example 10, the one or more thermochromatic inks of Example 9 are coated over an image and can be erased to show the image.

In Example 11, one or more additional thermochromatic inks are coated over the one or more inks of Example 10.

In Example 12, the one or more additional thermochromatic inks of Example 11 can be heated to show a second image below the first image.

In Example 13, a process of creating a mess-free scratch off product is performed.

In Example 14, a piece of paper for coloring is configured to be reusable.

In Example 15, the piece of paper of Example 14 is configured to be cooled to eliminate any coloring on it.

In Example 16, the piece of paper of Example 14 is configured to be heated to eliminate any coloring on it.

In Example 17, a kit includes one or more thermochromatic inks, a piece of paper, and a writing utensil.

In Example 18, the one or more thermochromatic inks of Example 17 are printed on the piece of paper.

In Example 19, the one or more thermochromatic inks of Example 17 are configured to be mess-free scratch off.

In Example 20, the kit of Example 17 includes a variety of papers and writing utensils specifically formulated to work with the variety of papers.

In Example 21, the kit of Example 17 contains one type of paper and a writing utensil specifically formulated for the type of paper.

In Example 22, a kit includes one or more thermochromatic inks, a toy, and a writing utensil, where the writing utensil is specifically formulated for the use on toys.

In Example 23, any one or any combination of Examples 1-22 is optionally configured such that all elements or options recited are available to use or select from.

DESCRIPTION

The present invention relates to thermochromatic inks. In some embodiments, thermochromatic inks are incorporated into toys, games, or educational items for children. One example includes a substrate such as paper with numbered dots printed thereon such that a child can connect the dots to form an image, wherein the dots include thermochromatic ink. The substrate can then be heated or cooled causing the dots to disappear, leaving only the image created by the child on the paper. Heating or cooling can then be used to make the dots reappear, if desired. The temperature at which the ink changes color when cooled can be different than the temperature at which the ink changes color when heated.

Another embodiment includes preprinted images on a substrate in the style of a coloring book, such as outlines, that can be filled in by the child. The outlines include thermochromatic ink. Once filled in, the substrate can then be heated or cooled to cause the outlines to disappear, leaving only the filled-in image. In some embodiments, the outlines include standard inks while the filled-in images are thermochromatic inks. By heating or cooling the substrate, the user's filled-in ink images can be rendered invisible. In some embodiments, by rendering the images invisible, the substrate can then be reused, allowing a user to fill-in images again.

Other embodiments can take advantage of a property of some thermochromatic inks, in which the inks do not become transparent but rather turn to white (or other suitable opaque color), which is the typical color of paper. The heat source to turn the ink opaque can simply be the friction of an eraser or such item as designed to produce the heat through friction. When cooled, the inks can return to their original color but potentially not at the same intensity. One embodiment of the present invention can be a mess-free coloring system, wherein the user can make markings disappear by heating with friction, caused by rubbing or by other suitable means, such as with a heated implement or with body heat. In another embodiment, a mess-free coloring system is provided by making markings with either thermochromatic inks or standard inks and then covering such prints with thermochromatic inks that can be changed either by heat or by the friction of an erasing stroke, vibrating contact point, or another heat-generating method. Embodiments of the mess-free coloring system can include a material that produces heat through friction that generates less detritus than a standard pencil eraser.

In another embodiment, a mess-free scratch-off item is provided. The item includes an image or marking that is at least partially covered and masked by thermochromatic ink that is originally opaque but that turns transparent upon heating. The image or marking can be revealed by heating the thermochromatic ink, for example by rubbing the item with an eraser or similar implement, by using body heat, or by using another suitable heating method.

In another embodiment, an educational item is provided. In one example, the item includes an educational question written in normal ink. For example, the question could be a math problem, a reading problem, a visual problem, or any suitable educational problem. The item also includes an educational answer that is masked by thermochromatic ink. When the user wants to check the answer, the user changes the color of the thermochromatic ink to a transparent or translucent color by any suitable means, revealing the answer. For example, the color of the thermochromatic ink can be changed using body heat, a heated or cooled implement, or by other suitable means. When finished, the user can change the color of the thermochromatic ink back to its original opaque color, remasking the answer, and allowing for reuse of the item. For example, the color of the thermochromatic ink can be changed back by placing the educational item in the freezer or refrigerator.

The thermochromatic inks of the present invention can be any suitable thermochromatic ink, including inks that include liquid crystals and leuco dyes, and can have any suitable transition point temperature, and the transition point can occur across any suitable range of temperatures. For example, the transition point can be 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200° F. The temperature range of the transition point can be, for example, 0.5, 1.0, 2, 3, 4, 5, 10, 15, 20, 25, 30, 35, or 40° F. One formulation, for example, can have a transition point of about 62° F. to about 87° F. and another can have a transition point of about 120° F. to about 140° F. In some examples, the one or more ink formulations used are those available from Pilot Corporation or Sawgrass Corporation. There are a variety of methods by which the thermochromatic inks can be applied, including, for example, gravure printing, flexo-coating or other suitable methods of coating and printing.

In some embodiments, more than one thermochromatic ink is used in a single ink formulation, with one or more temperature transition points and one or more colors or color combinations. In various examples, each of the ink formulations can have different thermal qualities with varying transition points. One of the benefits of using such inks in a combination is that multiple stages of heating can be used to reveal different layers of images, colors, or other types of prints.

The method of heating can be a device in the form of a pen or a wand of suitable shape wherein one end is heated to a desired temperature. In some examples, as the heat is applied to the inks using the pen or wand, drawings can be created on top of the printed images, colors or images can be revealed, or markings or images can be masked. In other examples, the pen or wand can have one end that is cooled to a desired temperature. The application of the cooled end of the pen or wand can create colors or drawings or can reveal or mask images on substrates that include thermochromatic inks.

Another aspect of the present invention is drawing device. In some examples, the drawing device includes a temperature element. A temperature element can be a heating element or a cooling element. In some embodiments, the device can have a heating element that is located below an opening slot for the printed film or other substrate that contains both images or colors and one or more thermochromatic pigment. In one embodiment, the heating element can include a patterned grid that has raised bumps on it that can be made of any number of heat resistant materials. The grid and these bumps can be placed in any sort of pattern. These bumps may have different heights and sizes depending on the effects desired. The substrate can be pressed into contact with the temperature element by a finger, a stylus, a stamp pad, or any other utensil that allows for putting pressure on the sheet. In some embodiments, as the substrate is inserted into the device, there is a covering sheet that prevents direct human contact with the heating or cooling element, for safety. In some examples, the protective cover can also serve as a guide to insertion of the material onto the device.

FIG. 1 illustrates one embodiment of the present invention, a drawing device 100. The device includes a heating element 10, a heat grid. The device includes a source of illumination 20. The device has a sheet of substrate 30 that includes at least one thermochromatic ink. The substrate is sufficiently far away from the heating element that the thermochromatic ink does not change color unless sufficient pressure is applied to the substrate effective to deflect the surface of the substrate and bring it temporarily sufficiently more proximate to the heating element. The device also includes a flexible encasement element 40, which can help to protect the user from the heating element 10. The device includes a roll of substrate 50, and a cutting device 60 for cutting the substrate into sheets. The device also includes a sensor 70 that detects is substrate 30 is present before allowing the heating element 10 to engage, as a safety feature.

Figure 2:
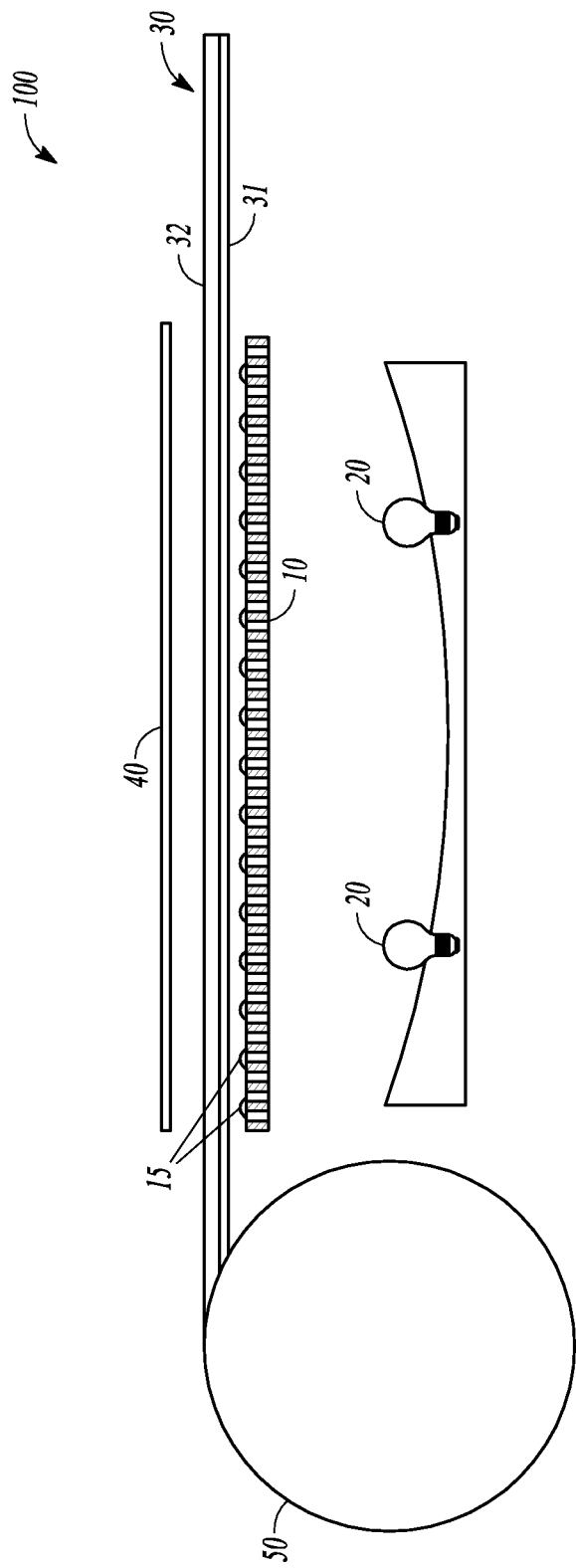
FIG. 2 illustrates a drawing device, in accordance with at least one embodiment of the present invention.

FIG. 2 illustrates one embodiment of the present invention, a side view of the device 100. The device includes a heating element 10, a heat grid. The device includes a source of illumination 20. The device has a sheet of substrate 30 that includes at least one thermochromatic ink 31. The thermochromatic ink 31 is on the side of the substrate facing the heating element. The substrate also includes a backing material 32 that supports the thermochromatic ink 31. In some examples, the backing material can also be referred to as the substrate. The substrate is sufficiently far away from the heating element that the thermochromatic ink does not change color unless sufficient pressure is applied to the substrate effective to deflect the surface of the substrate and bring it temporarily sufficiently more proximate to the heating element. The device also includes a flexible encasement element 40, which can help to protect the user from the heating element 10. The device includes a roll of substrate 50. The device includes bumps 15 to keep the substrate sufficiently far away from the heating element.

Figure 3:
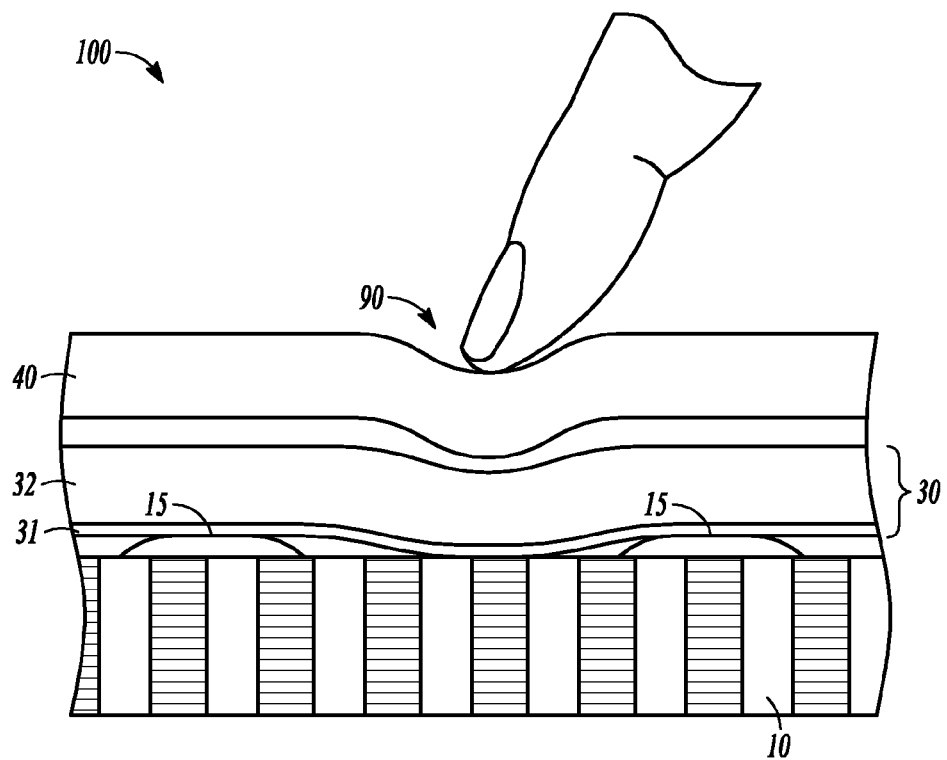
FIG. 3 illustrates a drawing device, in accordance with at least one embodiment of the present invention.

FIG. 3 illustrates one embodiment of the present invention, a side closeup view of the device 100. The closeup shows the heating grid 10 with bumps 15 disposed between the heating grid 10 and the substrate 30. The bumps 15 keep the substrate 30 sufficiently far away from the heating element such that the thermochromatic ink 31 does not change color without the application of pressure from the user. The substrate also includes a backing material 32 that supports the thermochromatic ink 31. In some examples, the backing material can also be referred to as the substrate. The closeup shows the flexible encasement element 40, which can help to protect the user from the heating element 10. The closeup shows the finger 90 of the user applying pressure to the device. The pressure from the finger 90, causes flexing of the encasement element 40, which causes flexing of the substrate 30, including the backing material 32 and the thermochromatic ink 31, which causes the thermochromatic ink 31 to be sufficiently proximate to the heating element 10 such that the thermochromatic ink 31 is heated and changes color in response to the pressure applied to the device from the user.

Figure 4:
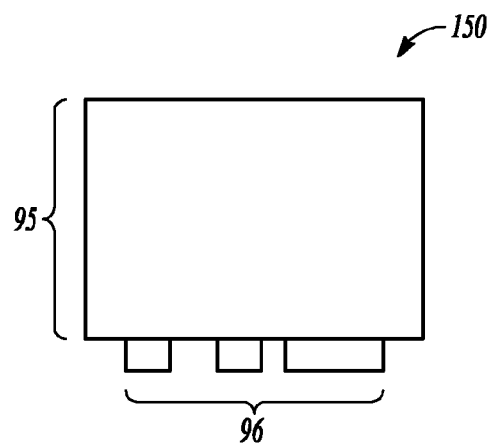
FIG. 4 illustrates an ink-free stamp, in accordance with at least one embodiment of the present invention.

FIG. 4 illustrates one embodiment of the present invention, a ink-free stamp 150. The ink-free stamp includes a gripping region 95 and a pattern region 96. A user can grasp the ink-free stamp at the gripping region 95 and press the pattern region 96 into a device, such as device 100 discussed above, causing a pattern that corresponds to the pattern region 96 to appear on the substrate.

Figure 5:
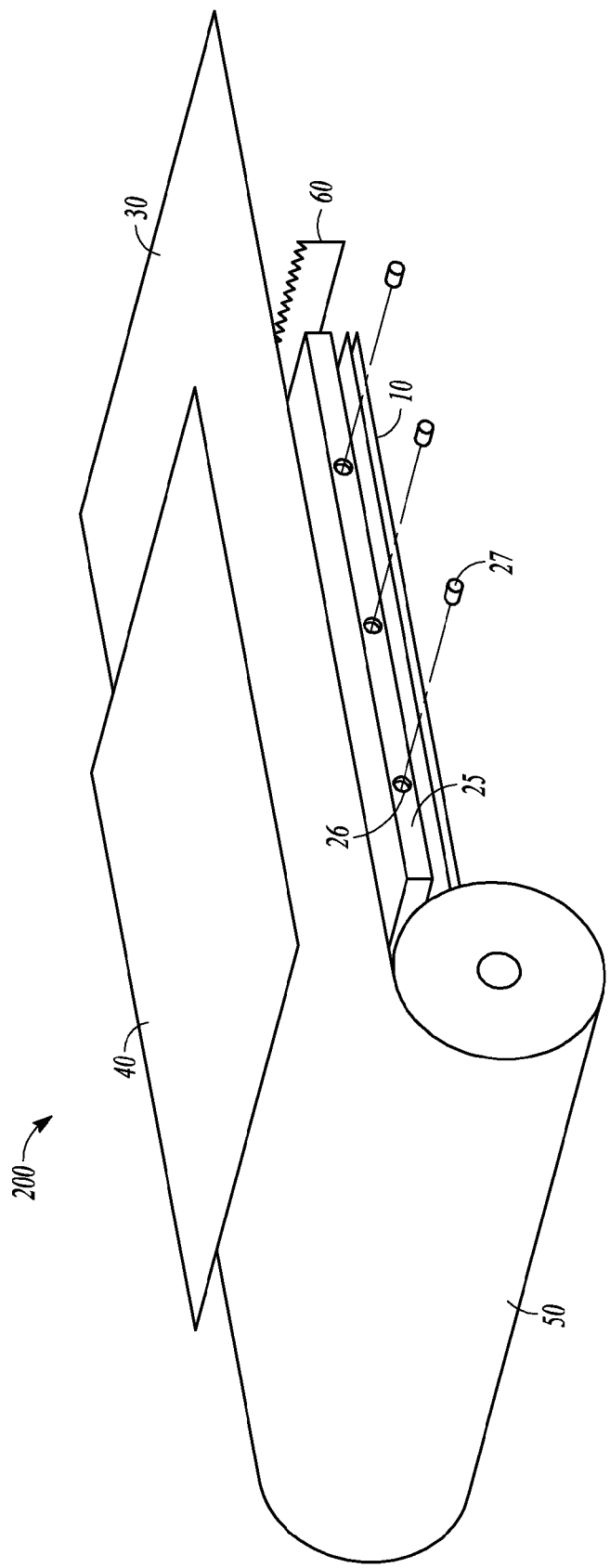
FIG. 5 illustrates a drawing device, in accordance with at least one embodiment of the present invention.

FIG. 5 illustrates one embodiment of the present invention, a drawing device 200. The device 200 is a variation of the device 100. Device 200 includes a heating element 10. The device includes a source of illumination 27, LED lights. The LED lights 27 fit into holes 26 in an acrylic sheet 25 that is disposed between the heating element 10 and a substrate 30. The acrylic sheet 25 acts as a light pipe, and distributes the light from the LED lights 27 across the sheet, providing a backlight. The substrate 30 that includes at least one thermochromatic ink. The substrate is sufficiently far away from the heating element 10 and acrylic sheet 25 that the thermochromatic ink does not change color unless sufficient pressure is applied to the substrate effective to deflect the surface of the substrate and bring it temporarily sufficiently more proximate to the heating element. The device also includes a flexible encasement element 40, which can help to protect the user from the heating element 10. The device includes a roll of substrate 50.

In another embodiment, rather than using raised bumps to keep the substrate at a sufficient distance from the heating or cooling element, other means are used to keep the substrate sufficiently far away from the element such that the thermochromatic inks on the substrate do not change color unless pressure is applied. Examples of ways to keep the substrate sufficiently far away from the element are keeping the substrate under tension, putting a foam-like pressure resistant and/or heat resistant material between the substrate and the heating element, using wires or strings under tension to suspend the substrate above the heating element, or other suitable means.

In another embodiment, the device can have a heating or cooling element that is designed to heat or cool the entire substrate without any pressure being applied thereon. The heating or cooling of the substrate by the heating or cooling element can reset the substrate to its original form after it has been used, allowing it to be reused. For example, the substrate can begin with an opaque or solid appearance, and can include one or more types of thermochromatic inks. Application of cold or hot temperature to parts of the substrate can allow a user to generate drawings or patterns on the substrate. Heating or cooling the substrate to a particular temperature can return the substrate to its original appearance, thereby resetting it and preparing it for reuse. The heating or cooling element of such a device is only turned on when the user desires to reset the substrate to its original form. In some embodiments, the heating or cooling element can become hot or cold quickly, allowing for a fast reset of the substrate. In some embodiments, the heating or cooling element can reach the desired temperature in 1, 5, 10, 20, or seconds, or 1, 2, 3, or 5 minutes. After the substrate is reset, the heating or cooling element can return to a normal temperature quickly, allowing the user to quickly reuse the substrate. In some embodiments, the heating or cooling element can return to a normal temperature in 1, 5, 10, 20, or 30 seconds, or 1, 2, 3, or 5 minutes.

In some embodiments, the device can include a means of illuminating the substrate from the back or side. In some examples, the light source can be a light bulb. The source of light penetrating the substrate may be a multi-colored LED, which can be programmably controlled by a microprocessor. This can enable the lighting to be of any color, change between colors, have lighting patterns, and fully controlled light sequencing that would make the use of the device attractive. In some embodiments, the lighting source can be a plastic sheet that feeds light from the edge of the material thus acting as a light pipe. The plastic can be at least one of acrylic, polycarbonate, or any other suitable plastic. This light-pipe sheet can be capable of reaching temperatures of up to 140° F., and this sheet can be a sufficient thermal conductor to enable the heating element to transfer heat into the plastic sheet which contacts the thermochromatic pigment. In some embodiments, the heating or cooling element is located under the light pipe sheet. In some examples, the heating or cooling element is in contact with the light pipe sheet.

In embodiments that include a backlight, changing the color of a thermochromatic ink on the substrate to a transparent or translucent color can have a dramatic visual effect. The change to a transparent color can allow large amounts of the backlight to shine through the transparent areas. In embodiments with a backlight that can change colors, the various colors of the light shining through the transparent or translucent areas can be highly visible to the viewer, enabling a satisfying artistic experience and a satisfying viewing experience. In some examples, this can give the backlit image a similar appearance to the backlit blackboards that are often used in restaurants, bars, and offices.

In some embodiments, the substrate that is inserted into the heating device can be a transparent or translucent material that can be in one or more layers and that can include one or more layers of thermochromatic inks and one or more layers of non-thermochromatic inks. In embodiments that include a backlight, clear or translucent substrate may provide a desirable backlight experience for the user or the viewer. In some embodiments, the substrate can be a paper or other material that is not necessarily clear or translucent. In some cases, it can be preferable to have the printed image on a white or other color background, rather than a clear background. With the application of cooling or heating, the thermochromatic inks can turn transparent or translucent to reveal images or colors, or the thermochromatic inks can turn different colors. With combinations of multiple thermochromatic inks, combinations of transition points, transparency, and different colors can create a wide variety of different patterns as a result of the heating or cooling treatment of the substrate. By combining inks with different transitional temperatures, different temperatures of heating and cooling can produce different colors. In some embodiments, the ink can be printed on the downward facing portion of the substrate. In some examples, the substrate can be a roll of material. In some examples, the roll of material can be mounted on the device. The device can have a cutting blade or other suitable cutting means that allow for the separation of the roll. Alternatively, the roll can be perforated into sheets that can be separated as desired. A variety of suitable separation devices can be used in conjunction with a roll.

In embodiments that include a configuration that allows changing the temperature of the substrate with a heated or cooled wand or pen, the embodiments do not include a configuration that allows deflection of the substrate towards a heating or cooling element. Likewise, in embodiments that include a configuration that allows changing the temperature of the substrate with a heating or cooling element by deflection of the substrate towards the heating or cooling element, the embodiments do not include a configuration that enables the changing of the temperature of the substrate with a heated or cooled wand or pen. Some embodiments include both a configuration that allows changing the temperature of the substrate with a heated or cooled wand or pen and a configuration that allows deflection of the substrate towards a heating or cooling element.

In certain embodiments of the present invention, the wand or pen could be a smart pen. The smart pen can have a variety of characteristics that enable it to be used to draw on a substrate that comprises a thermochromatic ink. In some embodiments, these can include the ability to principally heat or cool the tip when sufficiently proximate to a substrate for writing, the ability to change the temperature of the tip depending on a specific color transformation the user desires of a thermochromatic ink, or rapid heating and cooling of the tip. In some examples, the smart pen can include smart heating abilities, such that it can apply heat to the tip that is momentarily hotter than the final desired temperature of the tip in order to make the tip heat very quickly; once the tip reaches the desired temperature, the smart pen can then cool back to the desired temperature, such that the tip does not exceed the desired temperature.

In some examples, the smart pen can be designed to avoid particular hazards to which children are vulnerable. If the temperature change for an ink occurs over, such as, for example, 125° F., there is the risk that the heating element of the wand could be used in an unsafe manner, particularly by children. Unsafe use can include, for example, the user burning or hurting themselves, or the user burning or inflicting pain on someone else. In some embodiments of the present invention, the wand heats the tip up only when sufficiently near the substrate to be drawn on. When the wand is moved away from the substrate, the tip of the wand can cool rapidly, preventing misuse of a hot tip.

In some examples, the wand can quickly change and fine-tune temperatures, changing to the next temperature range of a thermochromatic ink layer or layers, and also having very fast temperature spike capability and control. The wand can allow good transfer of temperature from the wand to the ink/substrate. The wand can immediately or very quickly write in a particular stroke width and quality without having a delay while the wand heats up. Depending upon the surface contact and the substrate itself, the contact point or thermal transfer can vary, thus in certain embodiments the wand can spike up in temperature very quickly beyond the temperature range needed for the ink to change color, and once the heat transfers, it can intelligently re-adjust the wand tip temperature to produce the final results on the paper.

The intelligent temperature control capability of the wand in some embodiments can be important when the wand has multiple tip characteristics. The wand can have removable interchangeable tips that include, for example, a pin-point writing tip, a wide tip, or any suitable shape of tip. When the tips are changed, the temperature absorption characteristics of the tip can be different. A larger tip can have more mass that needs to heat up quickly. In some embodiments, the wand can sense the type of tip attached, and can spike the temperature high or low immediately so the tip heats or cools quickly but then settles down to a different level during normal use. Other attachments having less mass or better surface contact characteristics correspondingly have different spike temperature requirements. In embodiments that include a sensing capability to detect what particular attachment is attached, the sensing can take place by any suitable means. For example, the sensing can be electronic sensing or mechanical micro-switch contacts. In some embodiments, the wand can detect what type of tip is attached, and a microprocessor can determine which heat profile program to use for temperature management control. In some examples, if there is no tip installed, the wand can stop itself from heating.

In some embodiments, the wand only generates heat when it is near the thermochromatic writing surface. The writing tablet/support used for the device can have a surface that is specially detectable by the pen, or that detects the pen and lets the pen know it is near. For example, the tablet/support could have magnetic surface, such as, for example, a thin sheet of magnetized foil, which could be on a flat plastic surface, it could have a reflecting technology, it could have an RF emitting signal, or other various suitable technologies. A wand can have micro-processing capability to manage the thermal profiles, or handle the signal from the micro-sensor that detects whether it is near the writing surface, or a combination thereof.

Figure 6:
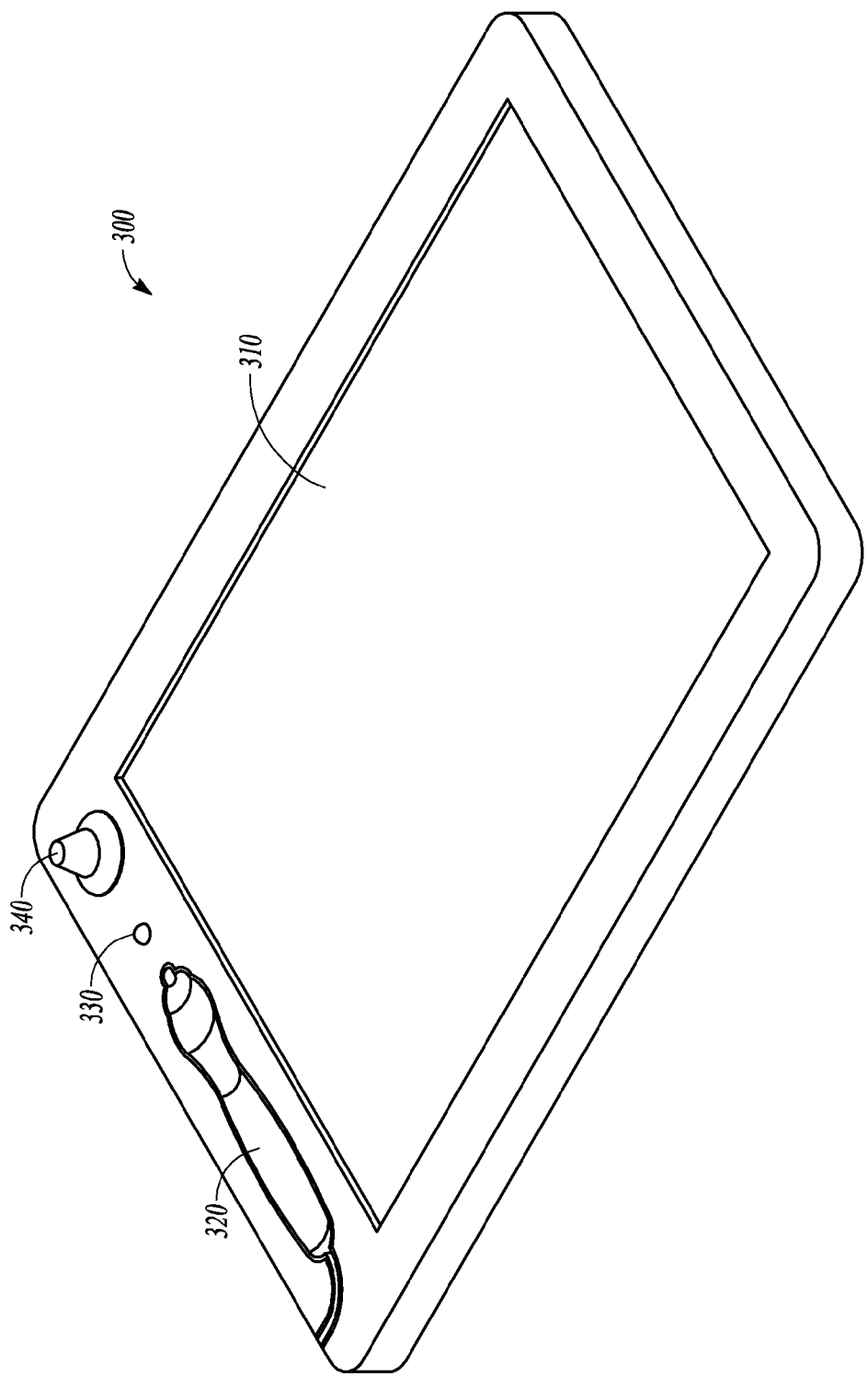
FIG. 6 illustrates a light box, in accordance with at least one embodiment of the present invention.

FIG. 6 illustrates one embodiment of the present invention, a light box 300. The light box 300 includes a flat work surface 310 configured to hold a substrate that includes markings that include thermochromatic ink. The light box also includes a lighting system that provides light to the work surface. The lighting system of light box 300 is within the light box, behind the flat work surface 310. The flat work surface 310 is transparent or translucent. The lighting system provides light behind the work surface 310 such that light shines through the work surface 310 and onto the substrate. The light box 300 includes a knob 340 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 300 includes an indicator light 330 to inform the user when a wand with a writing tip has reached a temperature such that it is ready to be used to draw on the substrate.

Figure 7:
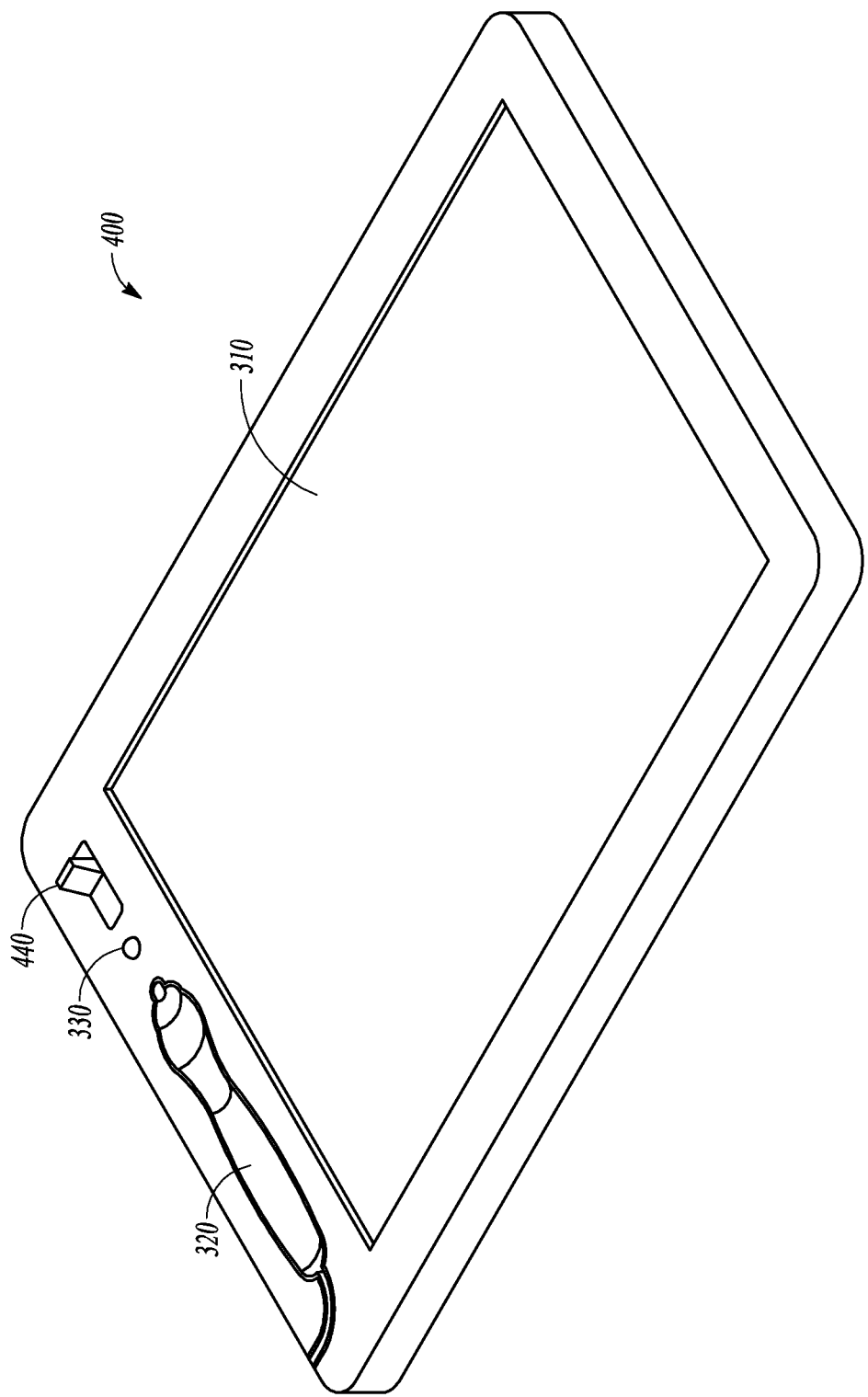
FIG. 7 illustrates a light box, in accordance with at least one embodiment of the present invention.

FIG. 7 illustrates one embodiment of the present invention, a light box 400. The light box 400 includes a flat work surface 310 configured to hold a substrate that includes markings that include thermochromatic ink. The light box also includes a lighting system that provides light to the work surface. The lighting system of light box 400 is within the light box, behind the flat work surface 310. The flat work surface 310 is transparent or translucent. The lighting system provides light behind the work surface 310 such that light shines through the work surface 310 and onto the substrate. The light box 400 includes a switch 440 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 400 includes an indicator light 330 to inform the user when a wand with a writing tip has reached a temperature such that it is ready to be used to draw on the substrate.

Figure 8:
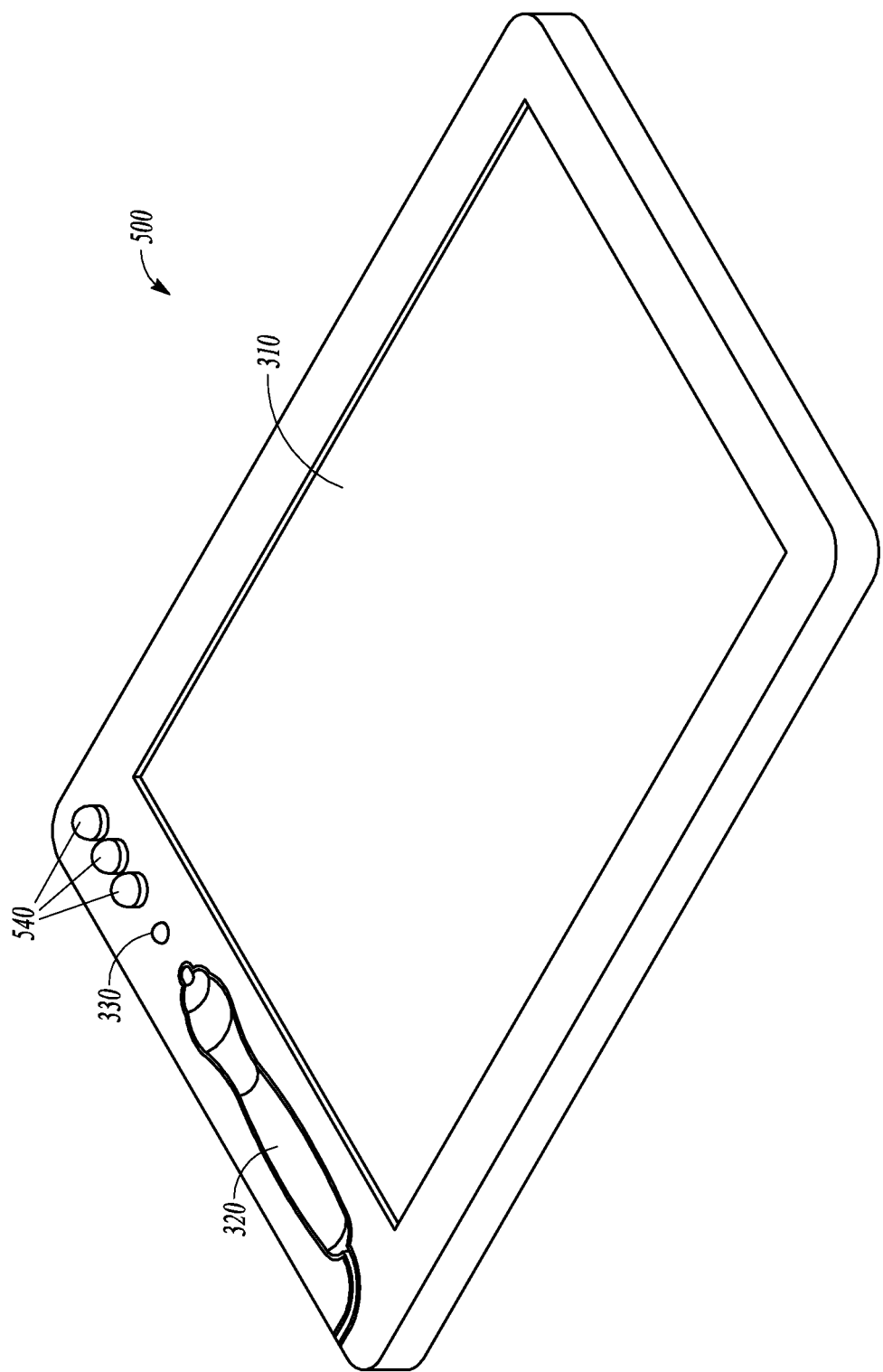
FIG. 8 illustrates a light box, in accordance with at least one embodiment of the present invention.

FIG. 8 illustrates one embodiment of the present invention, a light box 500. The light box 500 includes a flat work surface 310 configured to hold a substrate that includes markings that include thermochromatic ink. The light box also includes a lighting system that provides light to the work surface. The lighting system of light box 500 is within the light box, behind the flat work surface 310. The flat work surface 310 is transparent or translucent. The lighting system provides light behind the work surface 310 such that light shines through the work surface 310 and onto the substrate. The light box 500 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 500 includes an indicator light 330 to inform the user when a wand with a writing tip has reached a temperature such that it is ready to be used to draw on the substrate.

Figure 9:
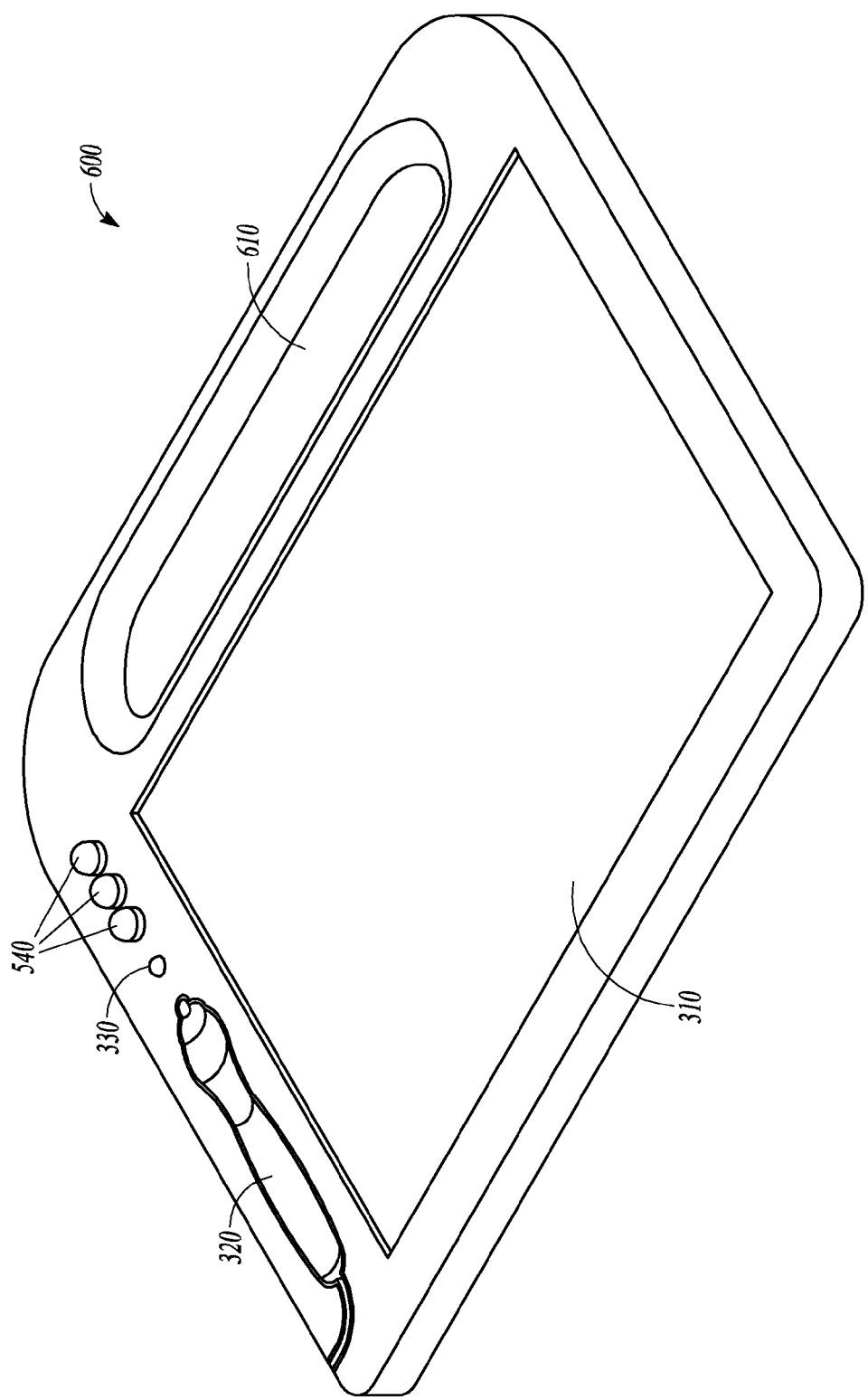
FIG. 9 illustrates a light box, in accordance with at least one embodiment of the present invention.

FIG. 9 illustrates one embodiment of the present invention, a light box 600. The light box 600 includes a flat work surface 310 configured to hold a substrate that includes markings that include thermochromatic ink. The light box also includes a lighting system that provides light to the work surface. The lighting system of light box 600 is within the light box, behind the flat work surface 310. The flat work surface 310 is transparent or translucent. The lighting system provides light behind the work surface 310 such that light shines through the work surface 310 and onto the substrate. The light box 600 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 600 includes an indicator light 330 to inform the user when a wand with a writing tip has reached a temperature such that it is ready to be used to draw on the substrate. The light box 600 includes a handle 610 that enables a user to easily carry the light box 600.

Figure 10:
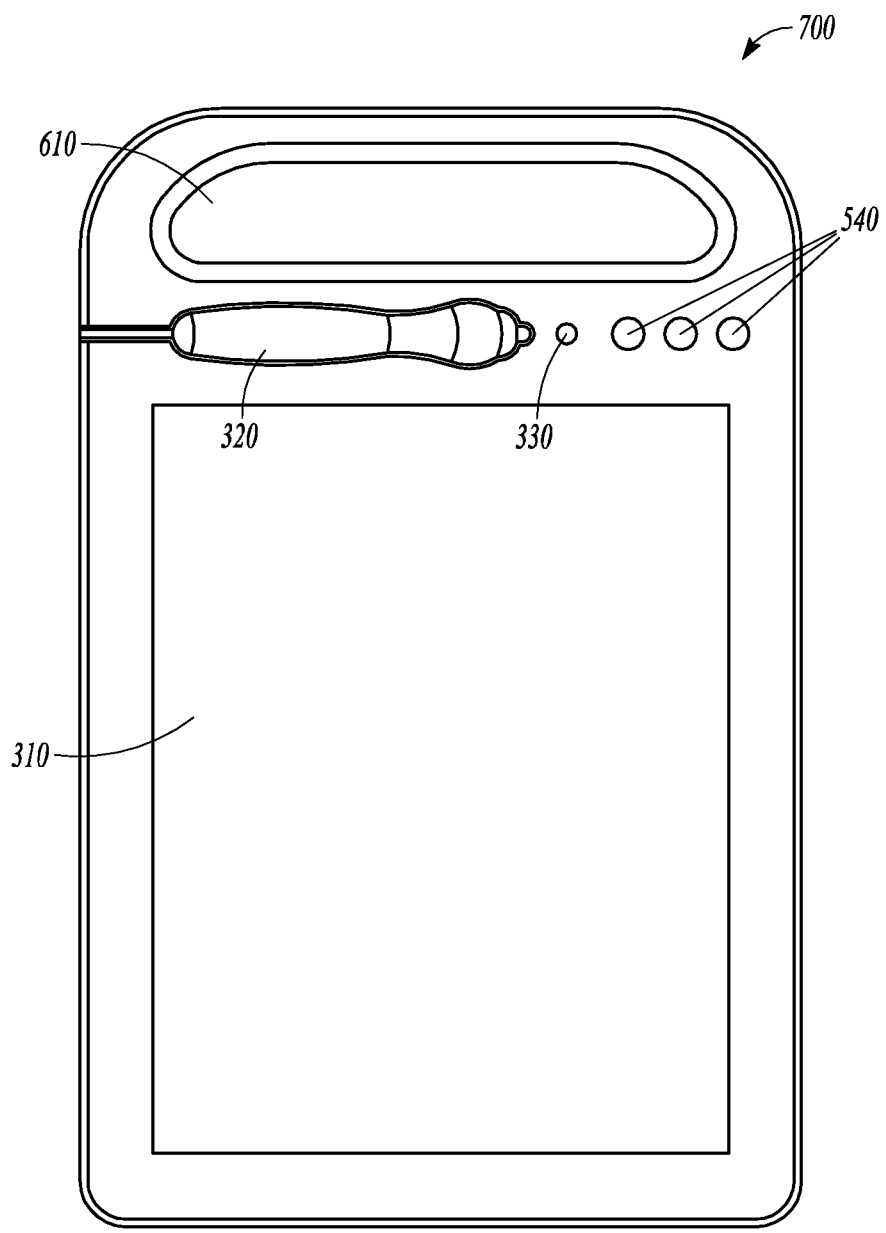
FIG. 10 illustrates a light box, in accordance with at least one embodiment of the present invention.

FIG. 10 illustrates one embodiment of the present invention, a light box 700. The light box 700 includes a flat work surface 310 configured to hold a substrate that includes markings that include thermochromatic ink. The light box also includes a lighting system that provides light to the work surface. The lighting system of light box 700 is within the light box, behind the flat work surface 310. The flat work surface 310 is transparent or translucent. The lighting system provides light behind the work surface 310 such that light shines through the work surface 310 and onto the substrate. The light box 700 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 700 includes an indicator light 330 to inform the user when a wand with a writing tip has reached a temperature such that it is ready to be used to draw on the substrate. The light box 700 includes a handle 610 that enables a user to easily carry the light box 700.

Figure 11:
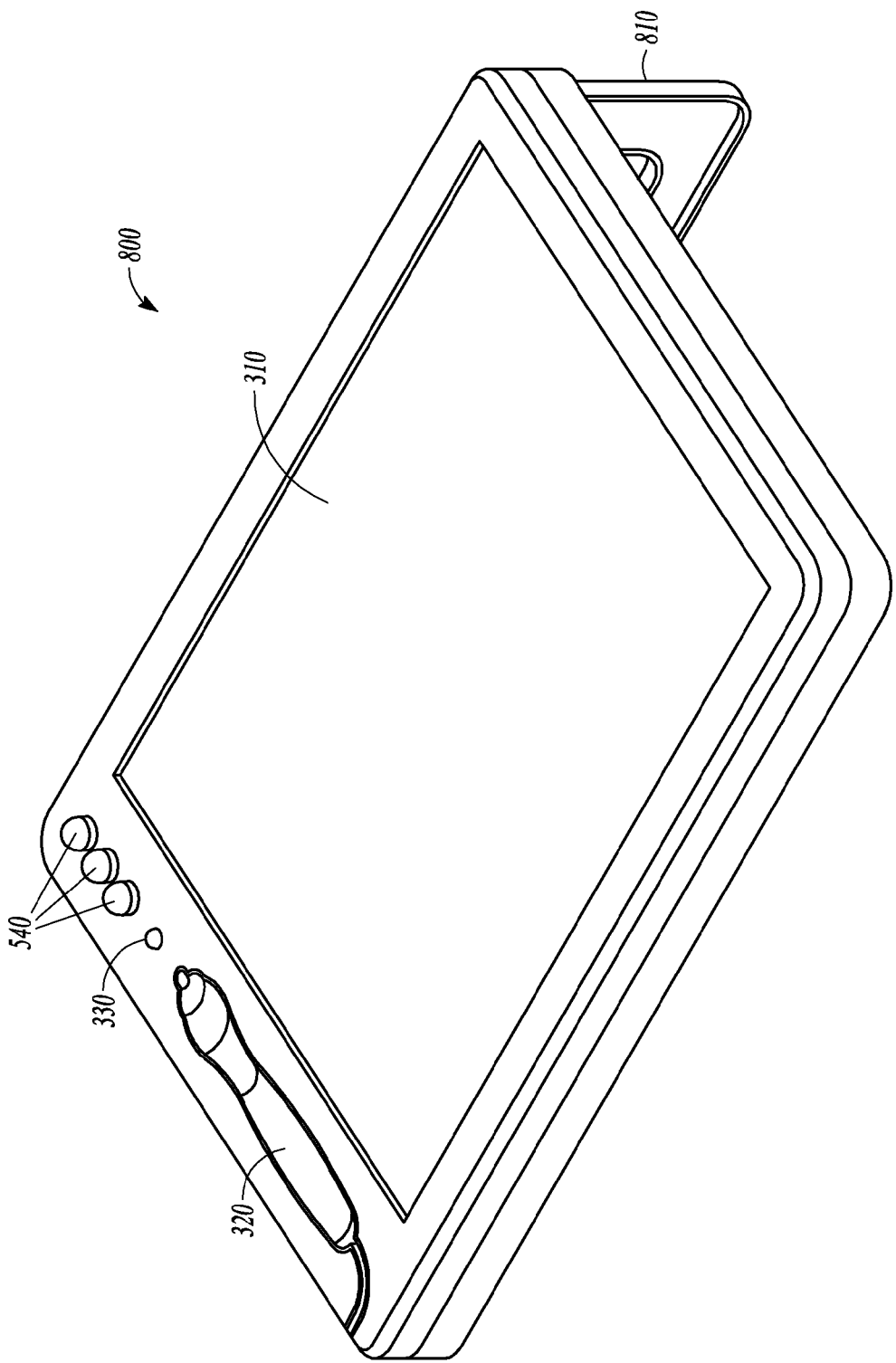
FIG. 11 illustrates a light box, in accordance with at least one embodiment of the present invention.

FIG. 11 illustrates one embodiment of the present invention, a light box 800. The light box 800 includes a flat work surface 310 configured to hold a substrate that includes markings that include thermochromatic ink. The light box also includes a lighting system that provides light to the work surface. The lighting system of light box 800 is within the light box, behind the flat work surface 310. The flat work surface 310 is transparent or translucent. The lighting system provides light behind the work surface 310 such that light shines through the work surface 310 and onto the substrate. The light box 800 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 800 includes an indicator light 330 to inform the user when a wand with a writing tip has reached a temperature such that it is ready to be used to draw on the substrate. The light box 800 includes a stand 810 that enables a user to easily carry the light box 800. In some embodiments, the stand can be hinged at the point of attachment to the light box 800. In some embodiments, the stand can double as a handle that enables a user to easily carry the light box 800.

Figure 12:
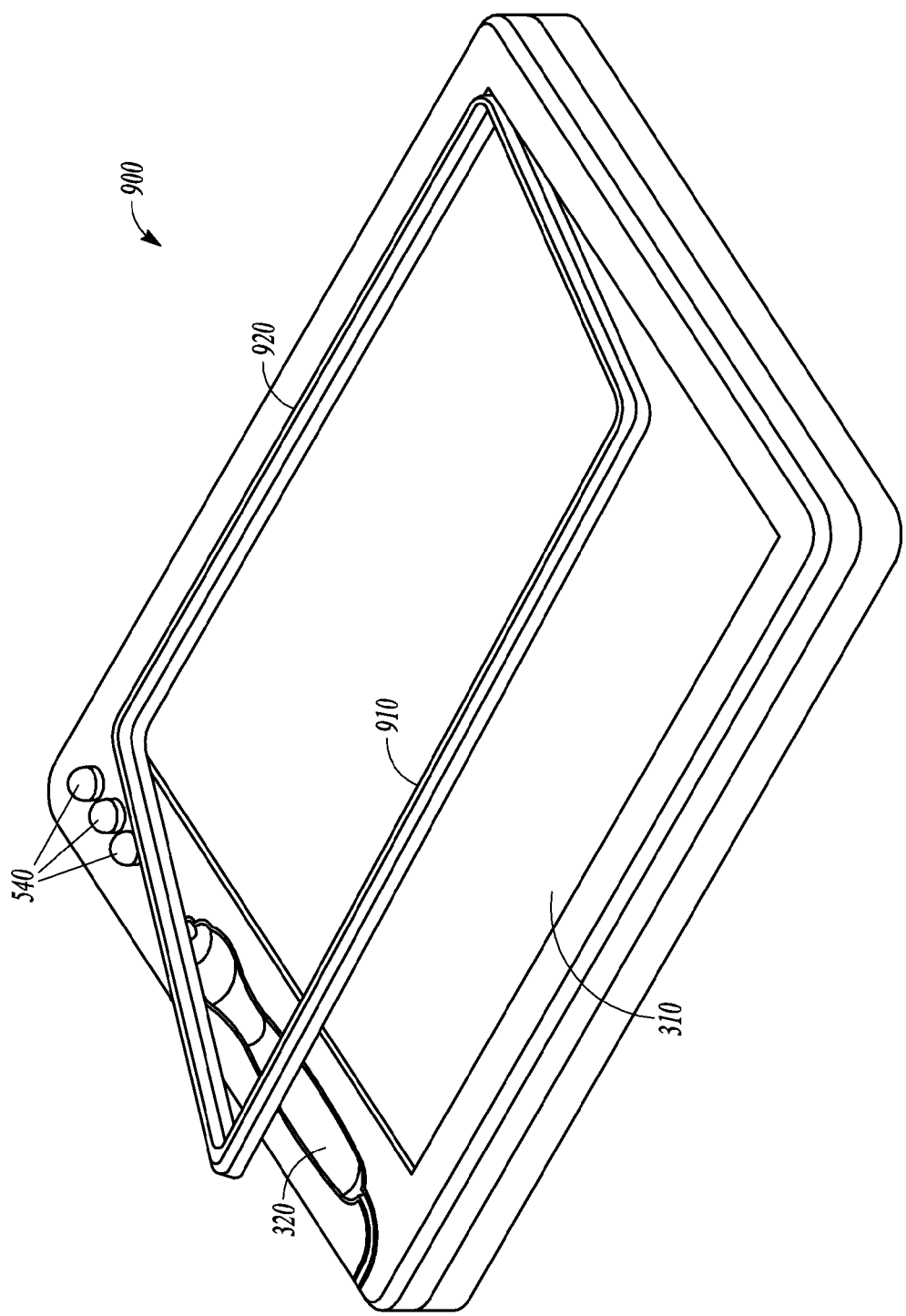
FIG. 12 illustrates a light box, in accordance with at least one embodiment of the present invention.

FIG. 12 illustrates one embodiment of the present invention, a light box 900. The light box 900 includes a flat work surface 310 configured to hold a substrate that includes markings that include thermochromatic ink. The light box also includes a lighting system that provides light to the work surface. The lighting system of light box 900 is within the light box, behind the flat work surface 310. The flat work surface 310 is transparent or translucent. The lighting system provides light behind the work surface 310 such that light shines through the work surface 310 and onto the substrate. The light box 900 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 900 includes an indicator light 330 to inform the user when a wand with a writing tip has reached a temperature such that it is ready to be used to draw on the substrate. The light box 900 includes a frame 910 configured to hold the substrate in place on the work surface 310. The frame 910 is hinged along one edge 920.

Figure 13:
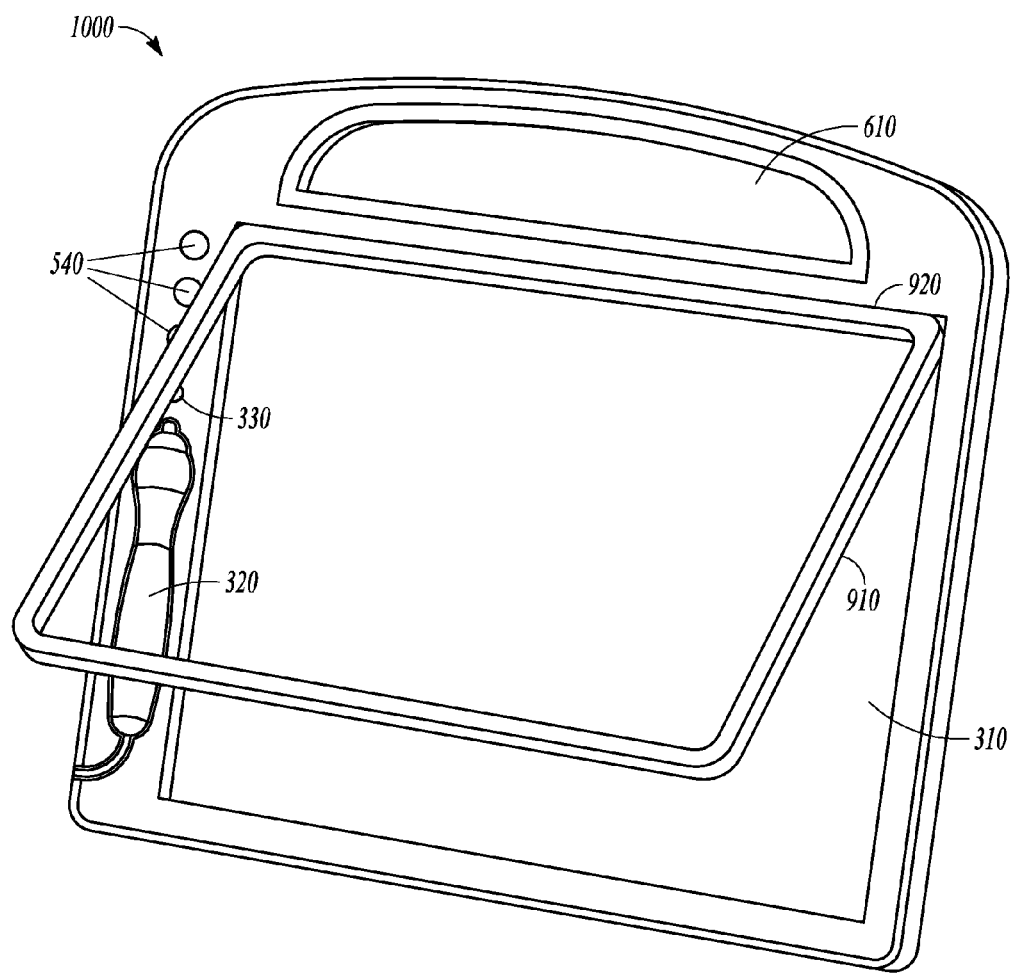
FIG. 13 illustrates a light box, in accordance with at least one embodiment of the present invention.

FIG. 13 illustrates one embodiment of the present invention, a light box 1000. The light box 1000 includes a flat work surface 310 configured to hold a substrate that includes markings that include thermochromatic ink. The light box also includes a lighting system that provides light to the work surface. The lighting system of light box 1000 is within the light box, behind the flat work surface 310. The flat work surface 310 is transparent or translucent. The lighting system provides light behind the work surface 310 such that light shines through the work surface 310 and onto the substrate. The light box 1000 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 1000 includes an indicator light 330 to inform the user when a wand with a writing tip has reached a temperature such that it is ready to be used to draw on the substrate. The light box 1000 includes a frame 910 configured to hold the substrate in place on the work surface 310. The frame 910 is hinged along one edge 920. The light box 1000 includes a handle 610 that enables a user to easily carry the light box 1000.

Figure 14:
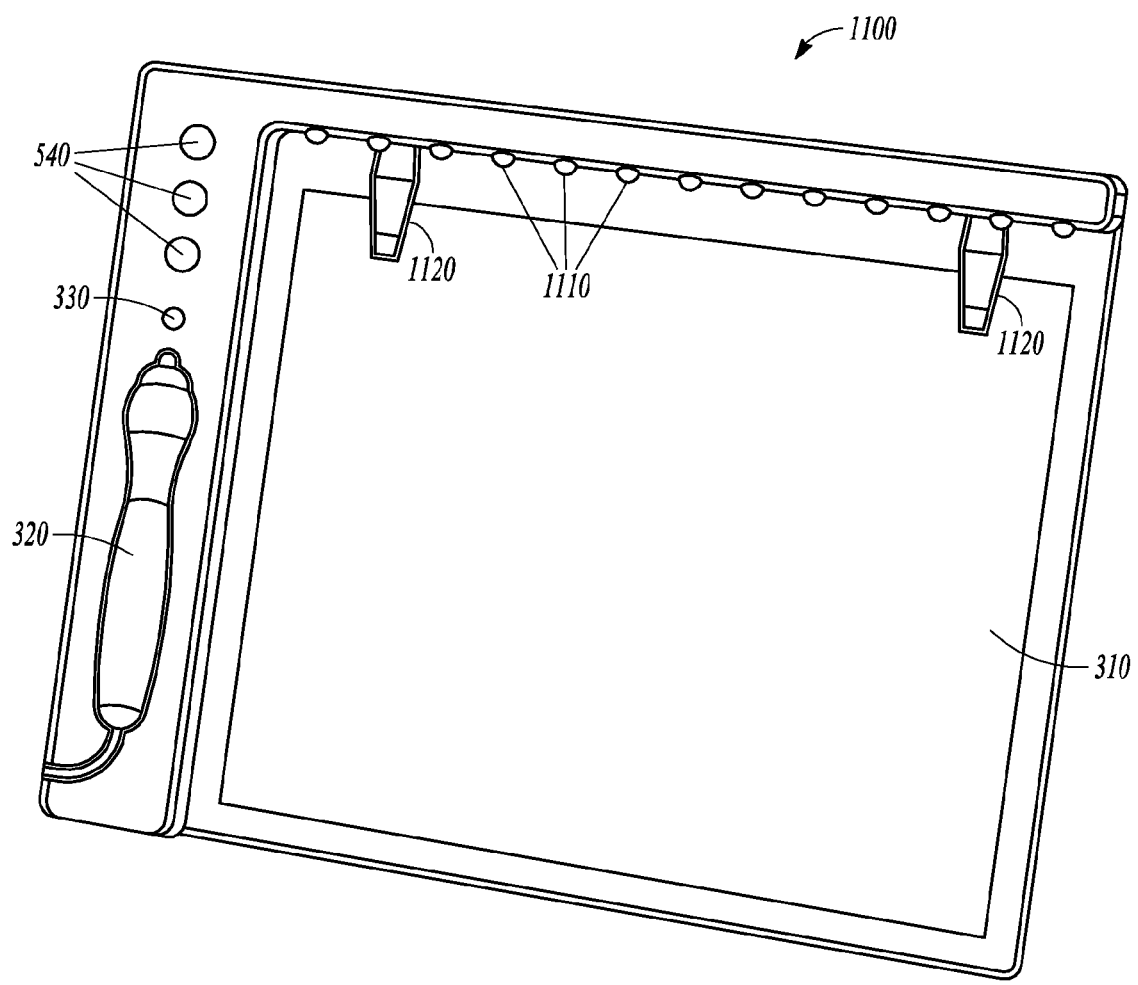
FIG. 14 illustrates a light box, in accordance with at least one embodiment of the present invention.

FIG. 14 illustrates one embodiment of the present invention, a light box 1100. The light box 1100 includes a flat work surface 310 configured to hold a substrate that includes markings that include thermochromatic ink. The light box also includes a lighting system that provides light to the work surface. The lighting system of light box 1100 includes the LED lights 1120, which shine light across the work surface 310, thereby illuminating a substrate thereon. The light box 1100 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 1100 includes an indicator light 330 to inform the user when a wand with a writing tip has reached a temperature such that it is ready to be used to draw on the substrate. The light box 1100 includes clips 1120 configured to hold the substrate in place on the work surface 310. In some embodiments, a light box can have both an internal lighting system disposed behind the work surface that shines light though the work surface and an external lighting system that shines light across the work surface.

Figure 15:
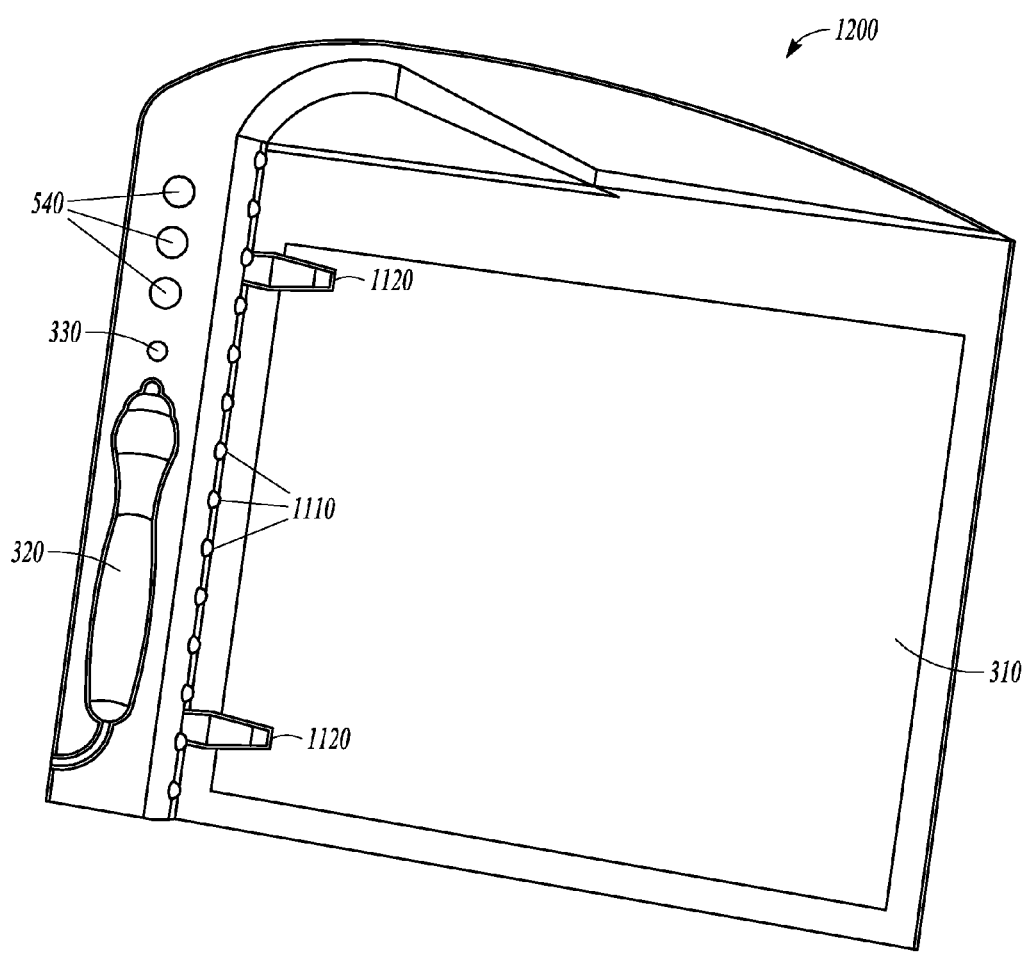
FIG. 15 illustrates a light box, in accordance with at least one embodiment of the present invention.

FIG. 15 illustrates one embodiment of the present invention, a light box 1200. The light box 1200 includes a flat work surface 310 configured to hold a substrate that includes markings that include thermochromatic ink. The light box also includes a lighting system that provides light to the work surface. The lighting system of light box 1100 includes the LED lights 1120, which shine light across the work surface 310, thereby illuminating a substrate thereon. The light box 1200 includes a plurality of buttons 540 for selecting the color of the light provided to the work surface 310 by the lighting system. The light box includes a receptacle 320 configured to hold a wand with a writing tip, wherein the tip of the wand is heated or cooled to allow a user to draw on the substrate. The light box 1200 includes an indicator light 330 to inform the user when a wand with a writing tip has reached a temperature such that it is ready to be used to draw on the substrate. The light box 1200 includes clips 1120 configured to hold the substrate in place on the work surface 310. The light box 1200 includes a handle 610 that enables a user to easily carry the light box 1200. In some embodiments, a light box can have both an internal lighting system disposed behind the work surface that shines light though the work surface and an external lighting system that shines light across the work surface.

Figure 16:
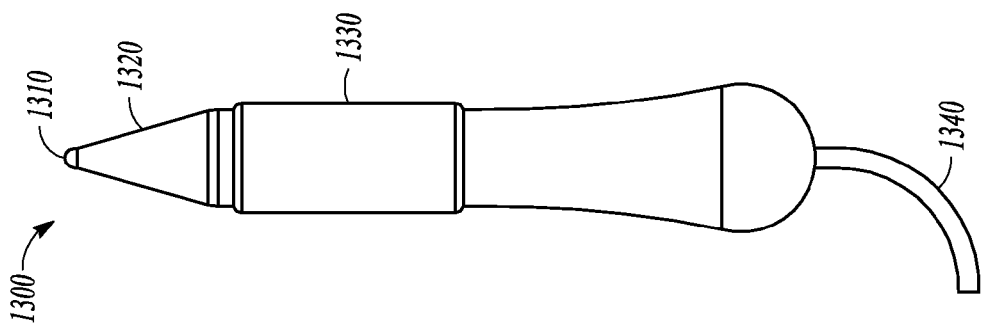
FIG. 16 illustrates a light box, in accordance with at least one embodiment of the present invention.

FIG. 16 illustrates an embodiment of the present invention, a wand 1300. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1300 is a smart wand.

Figure 17:
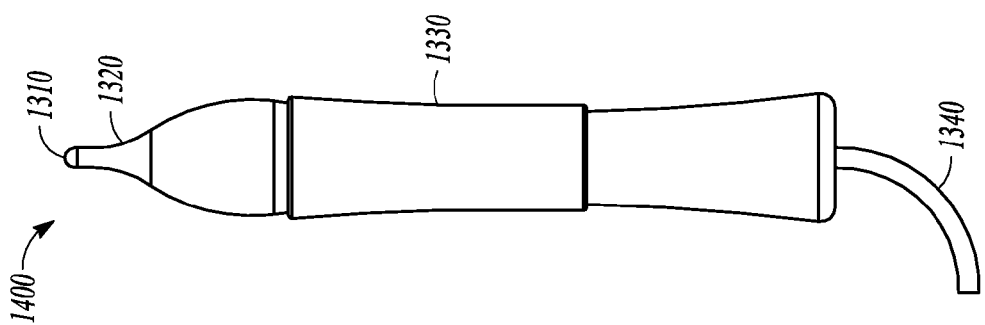
FIG. 17 illustrates a wand, in accordance with at least one embodiment of the present invention.

FIG. 17 illustrates an embodiment of the present invention, a wand 1400. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1400 is a smart wand.

Figure 18:
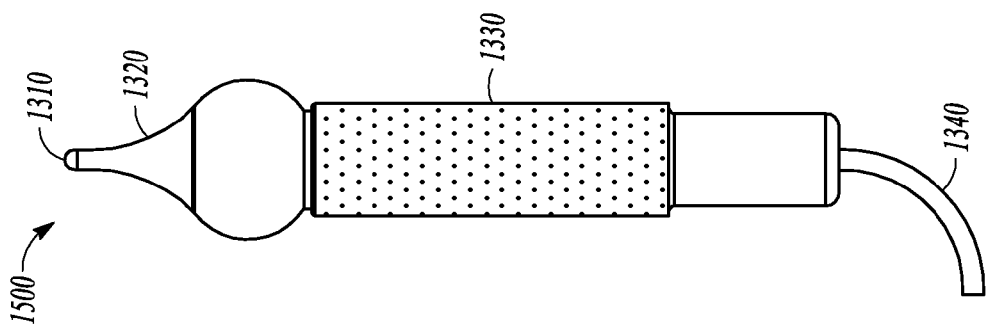
FIG. 18 illustrates a wand, in accordance with at least one embodiment of the present invention.

FIG. 18 illustrates an embodiment of the present invention, a wand 1500. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1500 is a smart wand.

Figure 19:
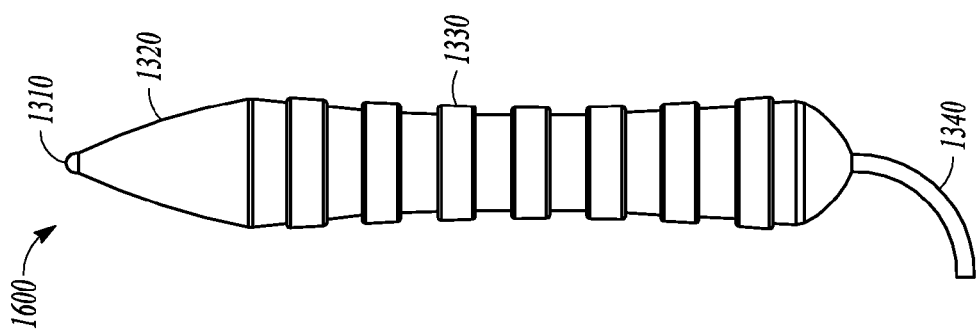
FIG. 19 illustrates a wand, in accordance with at least one embodiment of the present invention.

FIG. 19 illustrates an embodiment of the present invention, a wand 1600. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1600 is a smart wand.

Figure 20:
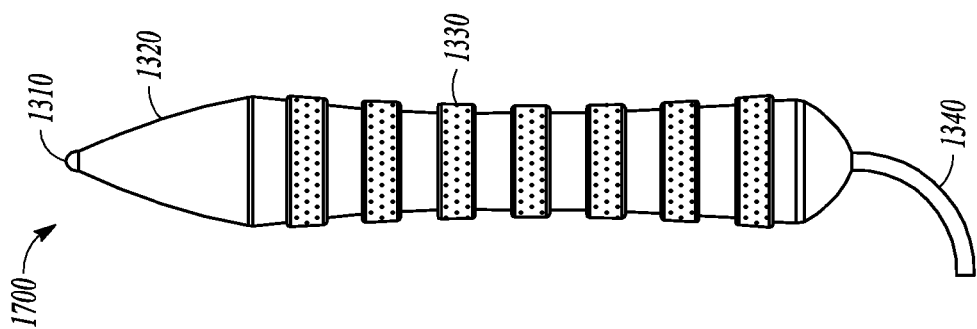
FIG. 20 illustrates a wand, in accordance with at least one embodiment of the present invention.

FIG. 20 illustrates an embodiment of the present invention, a wand 1700. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1700 is a smart wand.

Figure 21:
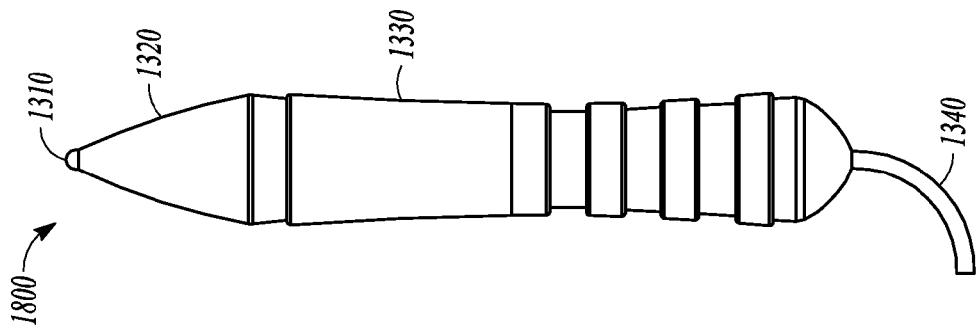
FIG. 21 illustrates a wand, in accordance with at least one embodiment of the present invention.

FIG. 21 illustrates an embodiment of the present invention, a wand 1800. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1800 is a smart wand.

Figure 22:
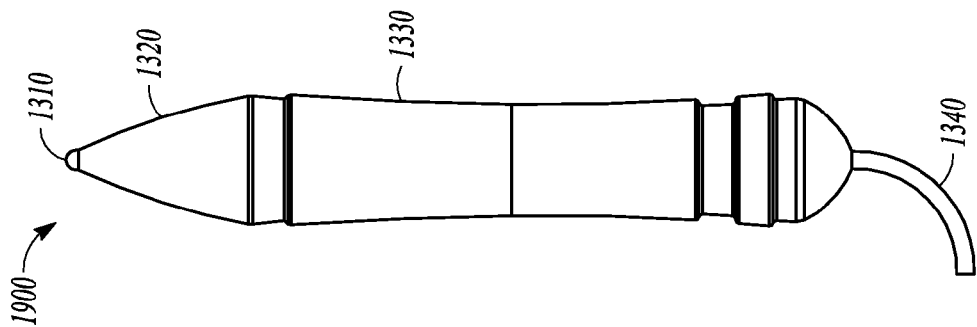
FIG. 22 illustrates a wand, in accordance with at least one embodiment of the present invention.

FIG. 22 illustrates an embodiment of the present invention, a wand 1900. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 1900 is a smart wand.

FIG. 23 illustrates an embodiment of the present invention, a wand 2000. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2000 is a smart wand.

FIG. 24 illustrates an embodiment of the present invention, a wand 2100. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2100 is a smart wand.

FIG. 25 illustrates an embodiment of the present invention, a wand 2200. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2200 is a smart wand.

FIG. 26 illustrates an embodiment of the present invention, a wand 2300. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2300 is a smart wand.

Figure 27:
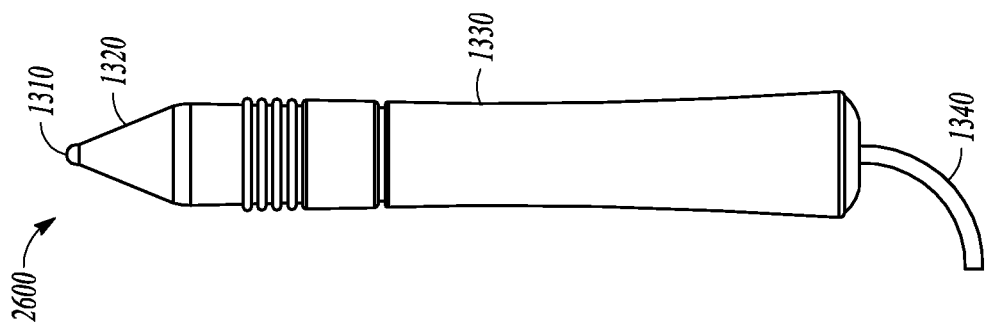
FIG. 27 illustrates a wand, in accordance with at least one embodiment of the present invention.

FIG. 27 illustrates an embodiment of the present invention, a wand 2400. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2400 is a smart wand.

Figure 28:
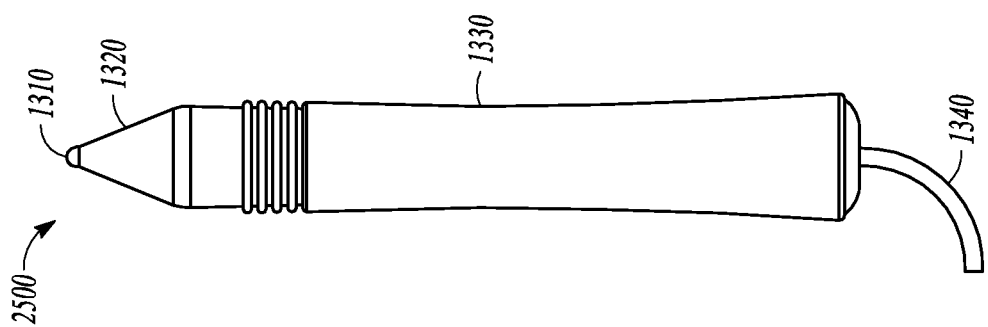
FIG. 28 illustrates a wand, in accordance with at least one embodiment of the present invention.

FIG. 28 illustrates an embodiment of the present invention, a wand 2500. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2500 is a smart wand.

Figure 29:
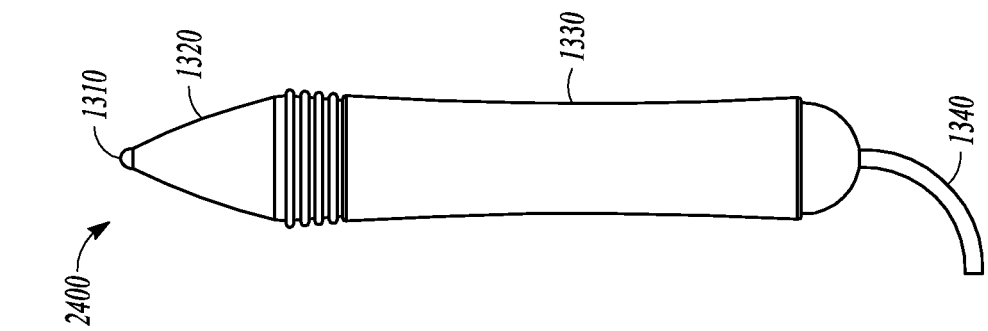
FIG. 29 illustrates a wand, in accordance with at least one embodiment of the present invention.

FIG. 29 illustrates an embodiment of the present invention, a wand 2600. The wand has a writing tip 1310 that can be cooled or heated to enable a user to draw on thermochromatic inks by inducing a color change. The writing tip 1310 is part of the tip 1320 of the wand. In some embodiments, the tip 1320 is permanent. In other embodiments, the tip is replaceable. The wand includes a grip 1330. The wand includes a cord 1340. Some embodiments of the wand do not include grips. Some embodiments of the wand do not include a cord. The cord 1330 can include electrical connections between the wand and a light box or other device that allow heating or cooling of the tip of the pen. In some embodiments, the cord merely secures the pen to a light box or other device. In some embodiments, the wand 2600 is a smart wand.

The above Detailed Description includes references to the accompanying drawings, which form a part of the Detailed Description. The drawings show, by way of illustration, specific embodiments in which the present subject matter can be practiced. These embodiments are also referred to herein as "examples." Equivalent materials to those disclosed herein may be substituted and utilized in the present inks, methods and kits without departing from the scope of the subject matter.

In the appended claims, the terms "including" and "in which" are used as the plain-English equivalents of the respective terms "comprising" and "wherein." Also, in the following claims, the terms "including" and "comprising" are open-ended, that is, a system, assembly, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Additional Embodiments

The present invention provides for the following exemplary embodiments:

Embodiment 1 provides a toy, including: at least one thermochromatic ink on the toy; wherein the thermochromatic ink changes from a first color to a second color when the temperature of the ink reaches a first temperature; wherein the thermochromatic ink reversibly changes color; wherein the thermochromatic ink returns to the first color when the temperature of the ink reaches a second temperature.

Embodiment 2 provides the toy of embodiment 1, wherein the first temperature equals the second temperature.

Embodiment 3 provides the toy of any one of embodiments 1-2, wherein the first temperature is greater than the second temperature.

Embodiment 4 provides the toy of any one of embodiments 1-3, wherein the first temperature is lower than the second temperature.

Embodiment 5 provides the toy of any one of embodiments 1-4, wherein: the ink reaches the first temperature when the ink is cooled until the temperature of the ink decreases to the first temperature; the ink reaches the second temperature when the ink is heated until the temperature of the ink rises to the second temperature.

Embodiment 6 provides the toy of embodiment 5, wherein the ink reaches the first temperature when the ink is cooled below the ambient temperature.

Embodiment 7 provides the toy of any one of embodiments 5-6, wherein the ink is cooled to reach the first temperature using a freezer.

Embodiment 8 provides the toy of any one of embodiments 5-7, wherein the ink is cooled to reach the first temperature using a cooled implement.

Embodiment 9 provides the toy of any one of embodiments 5-8, wherein the ink is heated to reach the second temperature using body heat of the user of the toy.

Embodiment 10 provides the toy of any one of embodiments 5-9, wherein the ink is heated to reach the second temperature using a heated implement.

Embodiment 11 provides the toy of embodiment 1, wherein: the ink reaches the first temperature when the ink is heated until the temperature of the ink rises to the first temperature; the ink reaches the second temperature when the ink is cooled until the temperature of the ink decreases to the second temperature.

Embodiment 12 provides the toy of embodiment 11, wherein the ink is heated to reach the first temperature using body heat from the user of the toy.

Embodiment 13 provides the toy of any one of embodiments 11-12, wherein the ink is heated to reach the first temperature using a heated implement.

Embodiment 14 provides the toy of any one of embodiments 11-13, wherein the ink reaches the second temperature when the ink is cooled below the ambient temperature.

Embodiment 15 provides the toy of any one of embodiments 11-14, wherein the ink reaches the second temperature when the ink is cooled using a freezer.

Embodiment 16 provides the toy of any one of embodiments 11-15, wherein the ink reaches the second temperature when the ink is cooled using a cooled implement.

Embodiment 17 provides a pre-printed item including: a substrate with a pre-printed marking; wherein the substrate is configured such that a drawing can be made on the substrate by a user; wherein when the temperature of at least part of the pre-printed item is changed to one or more particular temperatures, the color of the marking, the color of drawing, or both, changes; wherein at least one of the marking or the drawing include a thermochromatic ink.

Embodiment 18 provides the pre-printed item of embodiment 17, wherein the substrate has a drawing made by a user.

Embodiment 19 provides the pre-printed item of any one of embodiments 17-18, wherein when the temperature of the pre-printed item is changed to one or more particular temperatures, the color of the marking, the color of the drawing, or both, changes.

Embodiment 20 provides the pre-printed item of any one of embodiments 17-19, wherein when the temperature of the pre-printed item is changed to a particular temperature, the color of the marking, the color of the drawing, or both, changes.

Embodiment 21 provides the pre-printed item of any one of embodiments 17-20, wherein when the temperature of the marking of the pre-printed item is changed to a particular temperature, the color of the marking changes.

Embodiment 22 provides the pre-printed item of any one of embodiments 17-21, wherein when the temperature of the drawing of the pre-printed item is changed to a particular temperature the color of the drawing changes.

Embodiment 23 provides the pre-printed item of any one of embodiments 17-22, wherein the pre-printed marking is arranged to indicate to a user where to make the drawing on the substrate.

Embodiment 24 provides the pre-printed item of any one of embodiments 17-23, wherein when the pre-printed item is heated, the color of the marking, the color of the drawing, or both, changes.

Embodiment 25 provides the pre-printed item of any one of embodiments 17-24, wherein when the pre-printed item is cooled, the color of the marking, the color of the drawing, or both, changes.

Embodiment 26 provides the pre-printed item of any one of embodiments 17-25, wherein the drawing on the paper made by the user includes thermochromatic ink.

Embodiment 27 provides the pre-printed item of any one of embodiments 17-26, wherein the pre-made marking includes thermochromatic ink.

Embodiment 28 provides the pre-printed item of any one of embodiments 17-27, wherein the color change of at least one of the markings or drawings is reversible.

Embodiment 29 provides the pre-printed item of any one of embodiments 17-28, wherein the pre-printed item includes at least one of a coloring book or a dot-to dot.

Embodiment 30 provides the pre-printed item of any one of embodiments 17-29, wherein the substrate includes paper.

Embodiment 31 provides the pre-printed item of any one of embodiments 17-30, wherein the paper includes highly porous paper.

Embodiment 32 provides a process of applying inks to paper to make the pre-printed item of any one of embodiments 17-31, including at least one of gravure printing, flexo coating, or other suitable methods of printing.

Embodiment 33 provides a kit, including: the pre-printed item of any one of embodiments 17-31; and, at least one of a pen, a paintbrush, a writing utensil, a picture, thermochromatic ink, non-thermochromatic ink, paper, or example pictures.

Embodiment 34 provides an interactive item, including: a first marking including a first ink; a second marking including a second ink; wherein the second marking at least partially covers the first marking; wherein at least one of the first or second ink includes a thermochromatic ink; wherein changing the temperature of at least part of the interactive item alters the visual appearance of the item by changing the color of at least one of the first or second inks.

Embodiment 35 provides the interactive item of embodiment 34, wherein the interactive item is a mess-free item.

Embodiment 36 provides the interactive item of any one of embodiments 34-35, wherein changing the temperature includes heating.

Embodiment 37 provides the interactive item of any one of embodiments 34-36, wherein changing the temperature includes cooling.

Embodiment 38 provides the interactive item of any one of embodiments 34-37, wherein the second marking completely covers the first marking.

Embodiment 39 provides the interactive item of any one of embodiments 34-38, wherein the original color of the second ink is opaque, such that the first marking is not visible; wherein the heating of at least part of the interactive item reveals the first marking.

Embodiment 40 provides the interactive item of any one of embodiments 34-39, wherein changing the temperature of the item includes heating of the item by rubbing with a material; wherein the rubbing with the material generates less detritus than rubbing with a standard pencil-eraser.

Embodiment 41 provides the interactive item of embodiment 40, wherein the rubbing with the material generates no detritus.

Embodiment 42 provides the interactive item of any one of embodiments 34-41, wherein changing the temperature includes heating at least part of the item using a heated wand or other heated utensil.

Embodiment 43 provides the interactive item of any one of embodiments 34-42, wherein changing the temperature includes heating at least part of the item using a heated wand.

Embodiment 44 provides the interactive item of embodiment 43, wherein tip of the wand heats to a particular temperature when brought sufficiently close to the interactive item.

Embodiment 45 provides the interactive item of any one of embodiments 43-44, wherein the tip of the wand rapidly cools when moved sufficiently far away from the interactive item.

Embodiment 46 provides the interactive item of any one of embodiments 43-45, wherein the wand has programmable temperature control.

Embodiment 47 provides the interactive item of any one of embodiments 43-46, wherein the wand senses a tip attachment and selects an appropriate temperature profile.

Embodiment 48 provides the interactive item of any one of embodiments 43-47, wherein temperature of the tip of the wand changes to match a thermal color-change temperature of a specific thermochromatic ink.

Embodiment 49 provides the interactive item of any one of embodiments 34-48, wherein changing the temperature includes cooling at least part of the item using a cooled wand or other cooled utensil.

Embodiment 50 provides the interactive item of embodiment 49, wherein the wand cools the tip of the wand to a particular temperature when brought sufficiently close to the interactive item.

Embodiment 51 provides the interactive item of any one of embodiments 49-50, wherein the tip of the wand rapidly cools to a safe temperature when moved sufficiently far away from the interactive item.

Embodiment 52 provides the interactive item of any one of embodiments 49-51, wherein the wand has programmable temperature control.

Embodiment 53 provides the interactive item of any one of embodiments 49-52, wherein the wand senses a tip attachment and selects an appropriate temperature profile.

Embodiment 54 provides the interactive item of any one of embodiments 49-53, wherein the wand changes the temperature of the tip to match a thermal color-change temperature of a specific thermochromatic ink.

Embodiment 55 provides the interactive item of any one of embodiments 34-54, wherein the item has a backlight system to illuminate the item.

Embodiment 56 provides the interactive item of embodiment 55, wherein the backlight system has a programmable color control.

Embodiment 57 provides the interactive item of any one of embodiments 55-56, wherein the backlight system includes a LED lightpipe including a plastic sheet.

Embodiment 58 provides the interactive item of any one of embodiments 34-57, wherein the markings are made on paper.

Embodiment 59 provides the interactive item of any one of embodiments 34-58, wherein the paper includes highly porous paper.

Embodiment 60 provides a process of applying inks to paper to make the interactive item of any one of embodiments 34-59, including at least one of gravure printing, flexo coating, or other suitable methods of coating.

Embodiment 61 provides a kit for making the interactive item of any one of embodiments 34-59, including: at least one of a pen, a paintbrush, a writing utensil, a picture, thermochromatic ink, non-thermochromatic ink, a paper, or an example picture.

Embodiment 62 provides a kit, including: the interactive item of any one of embodiments 34-59; and, at least one of a pen, a paintbrush, a writing utensil, a picture, a thermochromatic ink, a non-thermochromatic ink, a paper, a wand, a backlight system, or an example picture.

Embodiment 63 provides a drawing device, including: a temperature element; a source of illumination; a sheet of substrate including at least one thermochromatic ink; wherein the substrate is sufficiently far away from the temperature element that the thermochromatic ink does not change color unless sufficient pressure is applied to the substrate effective to deflect the surface of the substrate and bring it temporarily sufficiently more proximate to the temperature element.

Embodiment 64 provides the drawing device of embodiment 63, wherein the temperature element is a heating element.

Embodiment 65 provides the drawing device of any one of embodiments 63-64, wherein the temperature element is a cooling element.

Embodiment 66 provides the drawing device of any one of embodiments 63-64, wherein the device includes a patterned grid; wherein the patterned grid is positioned between the substrate and the temperature element; wherein the source of illumination is positioned on the same side of the patterned grid as the temperature element; wherein the source of illumination is positioned effective to illuminate the majority of the substrate in contact with the patterned grid.

Embodiment 67 provides the drawing device of any one of embodiments 63-64, wherein the thermochromatic ink on the substrate is on the side of the substrate facing the temperature element.

Embodiment 68 provides the drawing device of any one of embodiments 63-67, wherein more than one thermochromatic ink is applied to the substrate, such that at least one of various colors or various temperature transition points occur;

Embodiment 69 provides the drawing device of any one of embodiments 63-68, wherein the source of illumination includes a lightpipe that includes plastic.

Embodiment 70 provides the drawing device of any one of embodiments 63-69, wherein the patterned grid has raised markings.

Embodiment 71 provides a backlight system including: a plastic sheet; a source of light; the plastic sheet including at least two major faces disposed opposite to one another, and including at least one edge; wherein the source of light is aligned with at least one edge of the sheet; wherein the plastic sheet acts as a light pipe, such that at least one major face of the backlight system is illuminated.

Embodiment 72 provides the backlight system of embodiment 71, wherein the source of light is one or more LEDs.

Embodiment 73 provides the backlight system of any one of embodiments 71-72, wherein the plastic includes at least one of acrylic, polycarbonate, or another suitable plastic.

Embodiment 74 provides the backlight system of any one of embodiments 71-73, wherein the backlight system has a programmable color control.

Embodiment 75 provides a smart wand including: a wand, wherein the wand includes a length for grasping by a user, and a tip configured for drawing on a substrate; wherein the substrate includes at least one thermochromatic ink; wherein drawing includes changing the temperature of the at least one thermochromatic ink sufficient to elicit a color change of the at least one thermochromatic ink; wherein the tip includes either a removable tip, or nonremovable permanent tip.

Embodiment 76 provides the smart wand of embodiment 75, wherein the smart wand heats the tip of the wand to a particular temperature when brought sufficiently close to the substrate.

Embodiment 77 provides the smart wand of embodiment 75-76, wherein the tip of the wand rapidly cools when moved sufficiently far away from the substrate.

Embodiment 78 provides the smart wand of any one of embodiments 75-77, wherein the wand has programmable temperature control.

Embodiment 79 provides the smart wand of any one of embodiments 75-78, wherein the wand senses a tip attachment and selects an appropriate temperature profile.

Embodiment 80 provides the smart wand of any one of embodiments 75-79, wherein the wand changes the temperature of the tip to match a thermal color-change temperature of a specific thermochromatic ink.

Embodiment 81 provides a kit, including: the smart wand of any one of embodiments 44-80; and, the interactive item of embodiment 16.

Embodiment 82 provides a light box, including: a flat work surface, configured to hold a substrate that includes markings including thermochromatic ink; a lighting system that provides light to the work surface.

Embodiment 83 provides the light box of embodiment 82, wherein the work surface is transparent or translucent, and wherein the lighting system is within the light box and provides light behind the work surface such that light shines through the work surface and onto the substrate.

Embodiment 84 provides the light box of any one of embodiments 82-83, wherein the lighting system provides light at the side of the work surface such that light shines across the substrate.

Embodiment 85 provides the light box of any one of embodiments 82-84, further including one or more of a knob, a button, or a switch for selecting the color of the light provided to the work surface.

Embodiment 86 provides the light box of any one of embodiments 82-85, further including a receptacle configured to hold a wand with a writing tip, wherein the tip of the wand is heated or cooled to allow a user to draw on the substrate.

Embodiment 87 provides the light box of any one of embodiments 82-86, further including an indicator light to inform the user when a wand with a writing tip has reached a temperature such that it is ready to be used to draw on the substrate.

Embodiment 88 provides the light box of any one of embodiments 82-87, further including the smart wand of embodiment 75.

Embodiment 89 provides the light box of any one of embodiments 82-88, further including a receptacle configured to hold the smart wand of embodiment 75.

Embodiment 90 provides the light box of any one of embodiments 82-89, further including a frame that is configured to hold the substrate in place on the work surface.

Embodiment 91 provides the light box of embodiment 90, wherein the frame is hinged along one edge.

Embodiment 92 provides the light box of any one of embodiments 82-91, further including clips configured to hold the substrate in place on the work surface.

Embodiment 93 provides the light box of any one of embodiments 82-92, further including a handle to allow easy carrying of the light box.

Embodiment 94 provides the light box of any one of embodiments 82-93, further including a stand to adjust the angle the light box sits on a surface.

Embodiment 95 provides the light box of any one of embodiments 82-94, wherein the lighting system includes the backlight system of embodiment 71.

Embodiment 96 provides the light box of any one of embodiments 82-95, wherein the substrate includes the interactive item of embodiment 34.

Embodiment 97 provides the light box of any one of embodiments 82-96, further including a wand with a writing tip, wherein the tip of the wand only becomes heated when the tip is proximate to the writing surface, wherein the tip of the wand rapidly cools when the tip is not proximate to the writing surface.

What is claimed is:
1. A drawing system comprising:
a pre-printed item comprising a substrate with a pre-printed marking; and
an implement, configured for holding in a hand, comprising at least one of a pen and wand, the implement configured to heat or cool a portion of the pre-printed item;
wherein the substrate is configured such that a drawing can be made on the substrate by a user, and at least one of the marking or the drawing comprises a reversible thermochromatic ink;

wherein the pre-printed item and the implement are configured so that when the temperature of the portion of the pre-printed item is heated or cooled using the implement, the color of the marking, the color of drawing, or both, changes.

2. The drawing system of claim 1, wherein the pre-printed item comprises at least one of a coloring book or a dot-to dot arrangement.

3. A kit, comprising:
the drawing system of claim 1; and,
at least one of a pen, a paintbrush, a writing utensil, a picture, a thermochromatic ink, a non-thermochromatic ink, paper, or an example picture.

4. The drawing system of claim 1, wherein the substrate comprises paper.

5. The drawing system of claim 4, wherein the paper comprises highly porous paper.

6. The drawing system of claim 1, wherein the pre-printed item is made by a process comprising at least one of gravure printing and flexo coating.

7. An interactive item, comprising:
a first marking comprising a first ink; and
a second marking comprising a second ink;
wherein the second marking at least partially covers the first marking;
wherein the second ink comprises a reversible thermochromatic ink, and the first ink optionally comprises a thermochromatic ink;
wherein the interactive item is configured so that a change in the temperature of at least part of the interactive item alters the visual appearance of the item by changing the color of at least one of the first or second inks.

8. The interactive item of claim 7,
wherein the second marking completely covers the first marking.

9. The interactive item of claim 7,
wherein the original color of the second ink is opaque, such that the first marking is not initially visible through the second marking;
wherein the item is configured so that the heating of at least part of the interactive item reveals the first marking, which was not initially visible through the second marking.

10. An interactive system, comprising:
the interactive item of claim 7; and
a material configured so that rubbing the item with the material causes the change in the temperature, in the form of heating, of at least part of the item;
wherein the rubbing with the material generates less detritus than rubbing with a standard pencil-eraser.

11. An interactive system, comprising:
the interactive item of claim 7; and
an implement comprising a wand or other utensil configured to change the temperature, in the form of heating, of the at least part of the item.

12. The interactive system of claim 11, wherein a tip of the implement is configured to heat to a particular temperature when brought sufficiently close to the interactive item.

13. The interactive system of claim 12, wherein the tip of the implement is configured to rapidly cool when moved a predetermined distance away from the interactive item.

14. The interactive system of claim 11, wherein implement is configured to sense a tip attachment and select an appropriate temperature profile.

15. An interactive system, comprising:
the interactive item of claim 7; and
an implement comprising a wand or other utensil configured to change the temperature, in the form of cooling, of the at least part of the item.

16. The interactive system of claim 15, wherein implement is configured to cool a tip of the implement to a particular temperature when within a predetermined distance to the interactive item.

17. The interactive system of claim 15, wherein the implement senses a tip attachment and selects an appropriate temperature profile.

18. An interactive system, comprising:
the interactive item of claim 7; and
a backlight system configured to to illuminate the item.

19. The interactive system of claim 18, wherein the backlight system comprises a programmable color control.

20. The interactive system of claim 18, wherein the backlight system comprises a LED lightpipe comprising a plastic sheet.

21. A kit, comprising:
the interactive item of claim 7; and
at least one of a pen, a paintbrush, a writing utensil, a picture, a thermochromatic ink, a non-thermochromatic ink, paper, a wand, a backlight system, or an example picture.

22. The interactive item of claim 7, wherein the markings comprise markings on paper.

23. The drawing system of claim 7, wherein the pre-printed item is made by a process comprising at least one of gravure printing and flexo coating.

* * * * *

UNITED STATES PATENT AND TRADEMARK OFFICE
CERTIFICATE OF CORRECTION

PATENT NO. : 8,662,893 B2  
APPLICATION NO. : 13/031651  
DATED : March 4, 2014  
INVENTOR(S) : Schwendimann et al.

Page 1 of 1

It is certified that error appears in the above-identified patent and that said Letters Patent is hereby corrected as shown below:

In the Claims

In column 25, line 8, in Claim 2, delete "dot-to dot" and insert --dot-to-dot--, therefor In column 26, line 31, in Claim 18, before "illuminate", delete "to", therefor Signed and Sealed this  
Second Day of December, 2014

Michelle K. Lee  
*Deputy Director of the United States Patent and Trademark Office*